US012698581B2

(12) United States Patent (10) Patent No.: US 12,698,581 B2

Shin et al. (45) Date of Patent: Aug. 4, 2026

(54) WASHING MACHINE AND METHOD FOR CONTROLLING THE SAME

(71) Applicant: SAMSUNG ELECTRONICS CO., LTD., Suwon-si (KR)

(72) Inventors: Jaeyoung Shin, Suwon-si (KR); Gyusung Na, Suwon-si (KR); Sungjong Kim, Suwon-si (KR); Jongha Park, Suwon-si (KR); Haneal Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 110 days.

(21) Appl. No.: 18/912,924

(22) Filed: Oct. 11, 2024

(65) Prior Publication Data

US 2025/0137186 A1 May 1, 2025

Related U.S. Application Data

(63) Continuation of application No. PCT/KR2024/014189, filed on Sep. 20, 2024.

(30) Foreign Application Priority Data

Oct. 27, 2023 (KR) ........................ 10-2023-0146082

(51) Int. Cl.
*D06F 34/16* (2020.01)
*D06F 23/02* (2006.01)
(Continued)

(52) U.S. Cl.
CPC .............. *D06F 34/16* (2020.02); *D06F 23/02* (2013.01); *D06F 23/04* (2013.01); *D06F 33/40* (2020.02);
(Continued)

(58) Field of Classification Search
CPC .......... D06F 33/48; D06F 34/16; D06F 23/02; D06F 23/04; D06F 33/40; D06F 33/47;
(Continued)

(56) References Cited

U.S. PATENT DOCUMENTS 9,637,854 B2 5/2017 Jung et al.
9,708,740 B2 7/2017 Bae et al.
(Continued)

FOREIGN PATENT DOCUMENTS

CA 2875648 A1 * 12/2013 .............. F16F 15/32
CN 111764101 A 10/2020
(Continued)

OTHER PUBLICATIONS

International Search Report and Written Opinion of the International Searching Authority dated Jan. 8, 2025, in connection with International Application No. PCT/KR2024/014189, 11 pages.

*Primary Examiner* — Benjamin L Osterhout

(57) ABSTRACT

A washing machine may include a tub; a drum configured to be rotatable inside the tub; a weight balancer coupled to the tub; a vibration sensor provided in the tub; and a controller, wherein the controller is configured to compare an unbalance value of laundry in the drum with a reference value based on a driving current applied to a motor configured to rotate the drum, obtain an angular speed of at least one rotation axis of the tub based on an output value of the vibration sensor in response to the unbalance value of the laundry being less than the reference value, and determine whether the weight balancer is damaged based on the angular speed of the at least one rotation axis of the tub.

20 Claims, 18 Drawing Sheets

```
┌─────────────────────────────────────────────────┐ ⌐1100
│  OBTAIN ANGULAR SPEED OF ROTATION AXIS OF TUB   │
└─────────────────────────────────────────────────┘
                        │
                        ▼
┌─────────────────────────────────────────────────┐ ⌐1200
│  DETERMINE WHETHER WEIGHT BALANCER IS DAMAGED   │
│  BASED ON ANGULAR SPEED OF ROTATION AXIS        │
└─────────────────────────────────────────────────┘
```

(51) Int. Cl.

| | |
|---|---|
| *D06F 23/04* | (2006.01) |
| *D06F 33/40* | (2020.01) |
| *D06F 33/48* | (2020.01) |
| *D06F 34/04* | (2020.01) |
| *D06F 34/28* | (2020.01) |
| *D06F 37/22* | (2006.01) |
| *D06F 37/24* | (2006.01) |
| *D06F 103/24* | (2020.01) |
| *D06F 103/26* | (2020.01) |
| *D06F 103/46* | (2020.01) |
| *D06F 105/58* | (2020.01) |
| *D06F 105/62* | (2020.01) |
| *G01C 19/56* | (2012.01) |
| *D06F 33/47* | (2020.01) |
| *D06F 34/05* | (2020.01) |
| *D06F 34/20* | (2020.01) |
| *D06F 37/26* | (2006.01) |
| *D06F 105/48* | (2020.01) |
| *G01P 3/56* | (2006.01) |

(52) U.S. Cl.
CPC .............. *D06F 33/48* (2020.02); *D06F 34/04* (2020.02); *D06F 34/28* (2020.02); *D06F 37/22* (2013.01); *D06F 37/24* (2013.01); *G01C 19/56* (2013.01); *D06F 33/47* (2020.02); *D06F 34/05* (2020.02); *D06F 34/20* (2020.02); *D06F 37/225* (2013.01); *D06F 37/26* (2013.01); *D06F 2103/24* (2020.02); *D06F 2103/26* (2020.02); *D06F 2103/46* (2020.02); *D06F 2105/48* (2020.02); *D06F 2105/58* (2020.02); *D06F 2105/62* (2020.02); *G01P 3/56* (2013.01)

(58) Field of Classification Search
CPC .......... D06F 34/04; D06F 34/20; D06F 34/28; D06F 37/22; D06F 37/225; D06F 37/24; D06F 37/26; D06F 34/05; D06F 2103/24; D06F 2103/26; D06F 2103/46; D06F 2105/48; D06F 2105/58; D06F 2105/62; G01C 19/56; G01P 3/56
See application file for complete search history.

(56) References Cited

U.S. PATENT DOCUMENTS

| | | | |
|---|---|---|---|
| 10,968,555 B2 | 4/2021 | Lee et al. | |
| 11,255,717 B2 * | 2/2022 | Omote ..................... G01H 1/12 |
| 2011/0060553 A1 * | 3/2011 | Han .................... H04L 12/2825 |
| | | | 702/185 |
| 2013/0026895 A1 | 1/2013 | Gweon et al. | |
| 2013/0327098 A1 * | 12/2013 | Bae ........................ D06F 33/47 |
| | | | 74/572.4 |
| 2019/0382935 A1 | 12/2019 | Lee et al. | |
| 2020/0248354 A1 | 8/2020 | Kang et al. | |

FOREIGN PATENT DOCUMENTS

| | | | | | |
|---|---|---|---|---|---|
| EP | 2671995 A1 | * | 12/2013 | .......... | D06F 37/225 |
| EP | 3628767 A1 | * | 4/2020 | .......... | D06F 37/304 |
| JP | 2012143513 A | * | 8/2012 | | |
| KR | 20040000865 A | * | 1/2004 | ............ | D06F 58/52 |
| KR | 100802468 B1 | | 2/2008 | | |
| KR | 20130012359 A | | 2/2013 | | |
| KR | 20130137513 A | | 12/2013 | | |
| KR | 101407959 B1 | * | 6/2014 | .......... | D06F 37/225 |
| KR | 20190104283 A | | 9/2019 | | |
| KR | 102089969 B1 | | 3/2020 | | |
| KR | 10-2020-0095983 A | | 8/2020 | | |
| KR | 10-2020-0140586 A | | 12/2020 | | |
| KR | 10-2219422 B1 | | 2/2021 | | |
| KR | 102229178 B1 | | 3/2021 | | |

* cited by examiner

END WASHING CYCLE    ~1310

OUTPUT SENSORY INFORMATION INDICATING DAMAGE TO WEIGHT BALANCER    ~1320

TRANSMIT SIGNAL INDICATING DAMAGE TO WEIGHT BALANCER    ~1330

WASHING MACHINE AND METHOD FOR CONTROLLING THE SAME

CROSS-REFERENCE TO RELATED APPLICATIONS

This application is a Bypass Continuation application of International Application No. PCT/KR2024/014189, filed Sep. 20, 2024, which claims priority to Korea patent application No. 10-2023-0146082 filed Oct. 27, 2023, in the Korean intellectual property office, the disclosures of which are incorporated by reference herein in their entirety.

BACKGROUND

1. Field

The disclosure relates to a washing machine and a method for controlling the same.

2. Description of Related Art

In general, a washing machine may include a tub and a drum rotatably installed in the tub, and may wash laundry by rotating the drum containing the laundry in the tub. The washing machine may perform a washing process of laundry, a rinsing process of the washed laundry, and a spin-drying process of the rinsed laundry.

In the spin-drying process, water absorbed in the laundry may be separated from the laundry by accelerating the drum containing the laundry at high speed.

Accelerating the drum at high speed may cause severe vibration and noise in the tub for various reasons, and may even damage the washing machine.

In particular, in the event of damage to a weight balancer that prevents weight imbalance of the tub, abnormal vibrations and noises may occur in the tub, which may cause anxiety to users.

SUMMARY

It is an aspect of the disclosure to provide a washing machine and a method for controlling the same that may easily identify whether a weight balancer is damaged.

According to an aspect of the disclosure, a washing machine may include: a tub; a drum configured to be rotatable inside the tub; a weight balancer coupled to the tub; a vibration sensor provided in the tub; and a controller, wherein the controller may be configured to compare an unbalance value of laundry in the drum with a reference value based on a driving current applied to a motor configured to rotate the drum, obtain an angular speed of at least one rotation axis of the tub based on an output value of the vibration sensor in response to the unbalance value of the laundry being less than the reference value, and determine whether the weight balancer is damaged based on the angular speed of the at least one rotation axis of the tub.

According to an aspect of the disclosure, a method for controlling a washing machine including a vibration sensor provided in a tub may include: obtaining an angular speed of at least one rotation axis of the tub based on an output value of the vibration sensor, and determining whether a weight balancer coupled to the tub is damaged based on the angular speed of the at least one rotation axis of the tub.

Before undertaking the DETAILED DESCRIPTION below, it may be advantageous to set forth definitions of certain words and phrases used throughout this patent document:

ment: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 illustrates an example of an exterior of a washing machine according to an embodiment.

DETAILED DESCRIPTION

Figure 1:
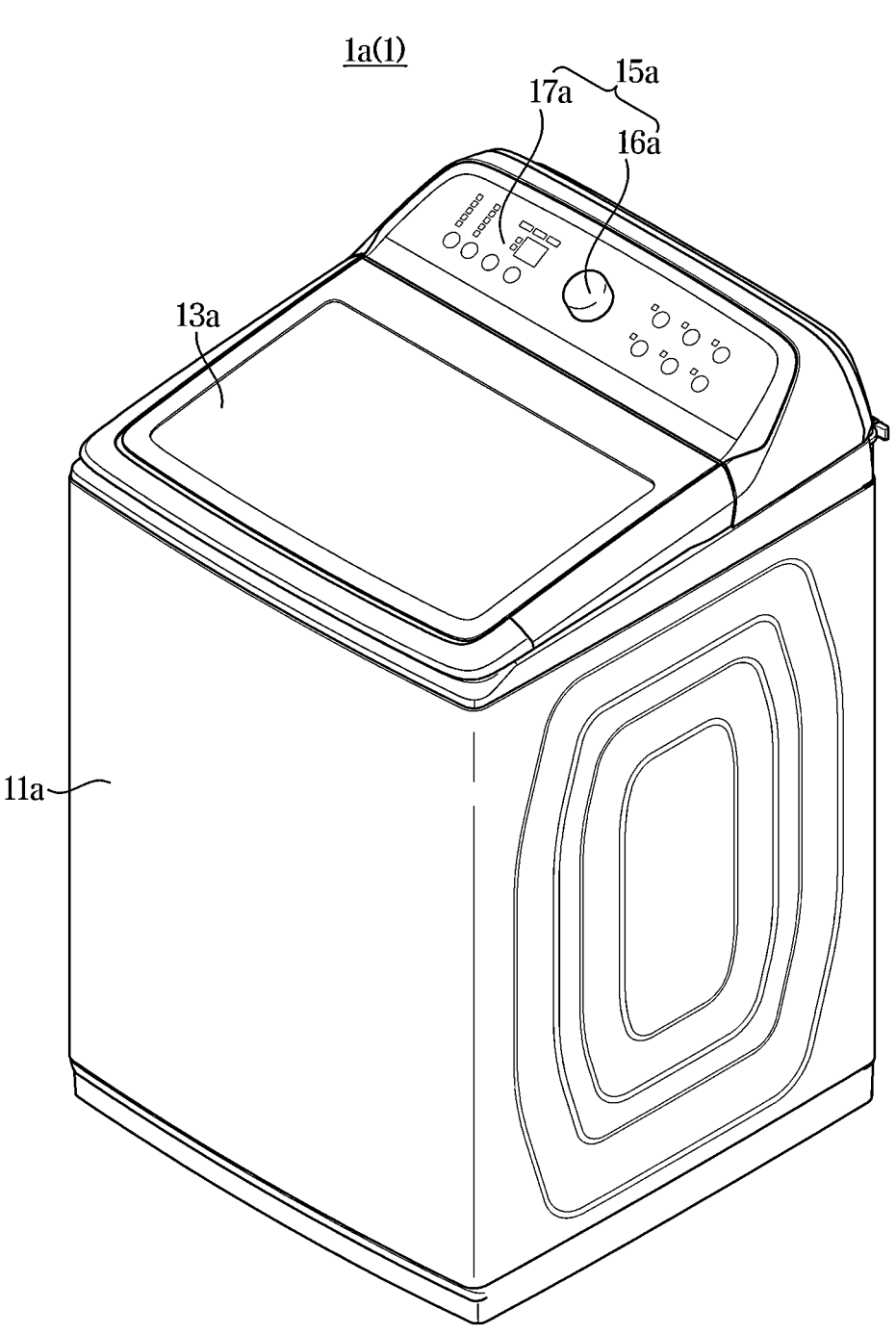
FIG. 1 illustrates an example of an exterior of a washing machine according to an embodiment.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments described in the specification and configurations shown in the accompanying drawings are merely examples of the disclosure, and various modifications may replace the embodiments and the drawings of the disclosure at the time of filing of the application.

Like reference numerals or symbols denoted in the drawings of the specification are members or components that perform the substantially same functions.

A singular form of a noun corresponding to an item may include one item or a plurality of the items, unless context clearly indicates otherwise.

As used herein, each of the expressions "A or B," "at least one of A and B," "at least one of A or B," "A, B, or C," "at least one of A, B, and C," and "at least one of A, B, or C," may include one or all possible combinations of the items listed together with a corresponding expression among the expressions.

The term "and/or" includes any and all combinations of one or more of a plurality of associated listed items.

It will be understood that the terms "first", "second", or the like, may be used only to distinguish one component from another, not intended to limit the corresponding component in other aspects (e.g., importance or order).

When it is said that one (e.g., first) component is "coupled" or "connected" to another (e.g., second) component, with or without the terms "functionally" or "communicatively", it means that one component may be connected to the other component directly (e.g., by wire), wirelessly, or through a third component.

It will be understood that when the terms "includes," "comprises," "including," and/or "comprising," when used in this specification, specify the presence of stated features, figures, steps, operations, components, members, or combinations thereof, but do not preclude the presence or addition of one or more other features, figures, steps, operations, components, members, or combinations thereof.

An expression that one component is "connected," "coupled," "supported," or "in contact" with another component includes a case in which the components are directly "connected," "coupled," "supported," or "in contact" with each other and a case in which the components are indirectly "connected," "coupled," "supported," or "in contact" with each other through a third component.

It will also be understood that when one component is referred to as being "on" or "over" another component, it may be directly on the other component or intervening components may also be present.

A washing machine according to various embodiments may perform washing, rinsing, spin-drying, and drying processes. The washing machine is an example of a clothes care apparatus, and the clothes care apparatus is a concept including a device capable of washing clothes (objects to be washed, and objects to be dried), a device capable of drying clothes, and a device capable of washing and drying clothes.

The washing machine according to various embodiments may include a top-loading washing machine in which a laundry inlet for inserting or withdrawing laundry is provided to face upward, or a front-loading washing machine in which a laundry inlet is provided to face forward. The washing machine according to various embodiments may include a washing machine that is in a loading type other than the top-loading washing machine and the front-loading washing machine.

In the top-loading washing machine, laundry may be washed using water current generated by a rotating body such as a pulsator. In the front-loading washing machine, laundry may be washed by repeatedly lifting and lowering laundry by rotating a drum. The front-loading washing machine may include a dryer combined washing machine capable of drying laundry stored in a drum. The dryer combined washing machine may include a hot air supply for supplying high-temperature air into the drum and a condenser for removing moisture from air discharged from the drum. For example, the dryer combined washing machine may include a heat pump. The washing machine according to various embodiments may include a washing machine using a washing method other than the above-described washing method.

The washing machine according to various embodiments may include a housing accommodating various components therein. The housing may be in the form of a box including a laundry inlet on one side thereof.

The washing machine may include a door for opening and closing the laundry inlet. The door may be rotatably mounted to the housing by a hinge. At least a portion of the door may be transparent or translucent to allow the inside of the housing to be seen.

The washing machine may include a tub arranged inside the housing to store water. The tub may be formed in a substantially cylindrical shape with a tub opening formed at one side thereof. The tub may be disposed inside the housing in such a way that the tub opening corresponds to the laundry inlet.

The tub may be connected to the housing by a damper. The damper may absorb vibration generated when the drum rotates, and the damper may reduce vibration transmitted to the housing.

The washing machine may include a drum provided to accommodate laundry.

The drum may be disposed inside the tub in such a way that a drum opening provided at one side of the drum corresponds to the laundry inlet and the tub opening. Laundry may pass through the laundry inlet, the tub opening, and the drum opening, sequentially and then be accommodated in the drum or withdrawn from the drum.

The drum may perform washing, rinsing, and/or spin-drying while rotating inside the tub. A plurality of through holes may be formed in a cylindrical wall of the drum to allow water stored in the tub to be introduced into or to be discharged from the drum.

The washing machine may include a driver configured to rotate the drum. The driver may include a drive motor and a rotating shaft for transmitting a driving force generated by the drive motor to the drum. The rotating shaft may penetrate the tub to be connected to the drum.

The driver may perform respective operations according to washing, rinsing, spin-drying, and/or drying processes by rotating the drum in a forward or reverse direction.

The washing machine may include a water supply configured to supply water to the tub. The water supply may include a water supply pipe and a water supply valve disposed in the water supply pipe. The water supply pipe may be connected to an external water supply source. The water supply pipe may extend from an external water supply source to a detergent supply and/or the tub. Water may be supplied to the tub through the detergent supply. Alternatively, water may be supplied to the tub without passing through the detergent supply.

The water supply valve may open or close the water supply pipe in response to an electrical signal of a controller. The water supply valve may allow or block the supply of water to the tub from an external water supply source. The water supply valve may include, for example, a solenoid valve configured to open and close in response to an electrical signal.

The washing machine may include the detergent supply configured to supply detergent to the tub. The detergent supply may include a manual detergent supply that requires a user to input detergent to be used for each washing and an automatic detergent supply that stores a large amount of detergent and automatically inputs a defined amount of detergent during washing. The detergent supply may include a detergent box for storing detergent. The detergent supply may be configured to supply detergent into the tub during a water supply process. Water supplied through the water supply pipe may be mixed with detergent via the detergent supply. Water mixed with detergent may be supplied into the tub. The term "detergent" may include, for example, detergent for pre-washing, detergent for main washing, fabric softener, bleach, and the like. The detergent box may be partitioned into a storage region for the pre-washing detergent, a storage region for the main washing detergent, a storage region for the fabric softener, and a storage region for the bleach.

The washing machine may include a drainage assembly configured to discharge water contained in the tub to the outside. The drainage assembly may include a drain pipe extending from a bottom of the tub to the outside of the housing, a drain valve disposed on the drain pipe to open and close the drain pipe, and a pump disposed on the drain pipe. The pump may pump water from the drain pipe to the outside of the housing.

The washing machine may include a control panel disposed on one side of the housing. The control panel may provide a user interface for interaction between a user and the washing machine. The user interface may include at least one input interface and at least one output interface.

The at least one input interface may convert sensory information received from a user into an electrical signal.

The at least one input interface may include a power button, an operation button, a course selection dial (or a course selection button), and a washing/rinsing/spin-drying setting button. The at least one input interface may include, for example, a tact switch, a push switch, a slide switch, a toggle switch, a micro switch, a touch switch, a touch pad, a touch screen, a jog dial, and/or a microphone.

The at least one output interface may visually or audibly transmit information related to the operation of the washing machine to a user.

For example, the at least one output interface may transmit information related to a washing course, operation time of the washing machine, and washing/rinsing/spin-drying settings to the user. Information about the operation of the washing machine may be output through a screen, an indicator, or voice. The at least one output interface may include a liquid crystal display (LCD) panel, a light emitting diode (LED) panel, or a speaker.

The washing machine may include a communication module for wired and/or wireless communication with an external device.

The communication module may include at least one of a short-range wireless communication module or a long-range wireless communication module.

The communication module may transmit data to an external device (e.g., a server, a user device, and/or a home appliance) or receive data from the external device. For example, the communication module may establish communication with a server and/or a user device and/or a home appliance, and transmit and receive various types of data.

For the communication, the communication module may establish a direct (e.g., wired) communication channel or a wireless communication channel between external devices, and support the performance of the communication through the established communication channel. According to an embodiment, the communication module may include a wireless communication module (e.g., a cellular communication module, a short-range wireless communication module, or a global navigation satellite system (GNSS) communication module) or a wired communication module (e.g., a local area network (LAN) communication module, or a power line communication module). Among these communication modules, the corresponding communication module may communicate with an external device through a first network (e.g., a short-range wireless communication network such as Bluetooth, wireless fidelity (Wi-Fi) direct, or infrared data association (IrDA)) or a second network (e.g., a long-range wireless communication network such as a legacy cellular network, a 5G network, a next-generation communication network, the Internet, or a computer network (e.g., LAN or WAN)). These various types of communication modules may be integrated as one component (e.g., a single chip) or implemented as a plurality of separate components (e.g., multiple chips).

The short-range wireless communication module may include a Bluetooth communication module, a Bluetooth Low Energy (BLE) communication module, a near field communication module, a WLAN (Wi-Fi) communication module, and a Zigbee communication module, an infrared data association (IrDA) communication module, a Wi-Fi Direct (WFD) communication module, an ultrawideband (UWB) communication module, an Ant+ communication module, a microwave (uWave) communication module, etc., but is not limited thereto.

The long-range wireless communication module may include a communication module that performs various types of long-range wireless communication, and may include a mobile communication circuitry. The mobile communication circuitry transmits and receives radio signals with at least one of a base station, an external terminal, or a server on a mobile communication network.

According to an embodiment, the communication module may communicate with an external device such as a server, a user device and other home appliances through an access point (AP). The access point (AP) may connect a local area network (LAN), to which a washing machine or a user device is connected, to a wide area network (WAN) to which a server is connected. The washing machine or the user device may be connected to the server through the wide area network (WAN). The controller may control various components of the washing machine (e.g., the drive motor and the water supply valve). The controller may control various components of the washing machine to perform at least one operation including water supply, washing, rinsing, and/or spin-drying according to a user input. For example, the controller may control the drive motor to adjust the rotation speed of the drum or control the water supply valve of the water supply device to supply water to the tub.

The controller may include hardware such as a central processing unit (CPU) or memory, and software such as a control program. For example, the controller may include at least one memory for storing an algorithm and program-type data for controlling the operation of components in the washing machine, and at least one processor configured to perform the above-mentioned operation by using the data stored in the at least one memory. The memory and the processor may each be implemented as separate chips. The processor may include one or more processor chips or may include one or more processing cores. The memory may include one or more memory chips or one or more memory blocks. Alternatively, the memory and the processor may be implemented as a single chip.

Hereinafter, a washing machine according to various embodiments of the disclosure will be described in detail with reference to the accompanying drawings.

Figure 4:
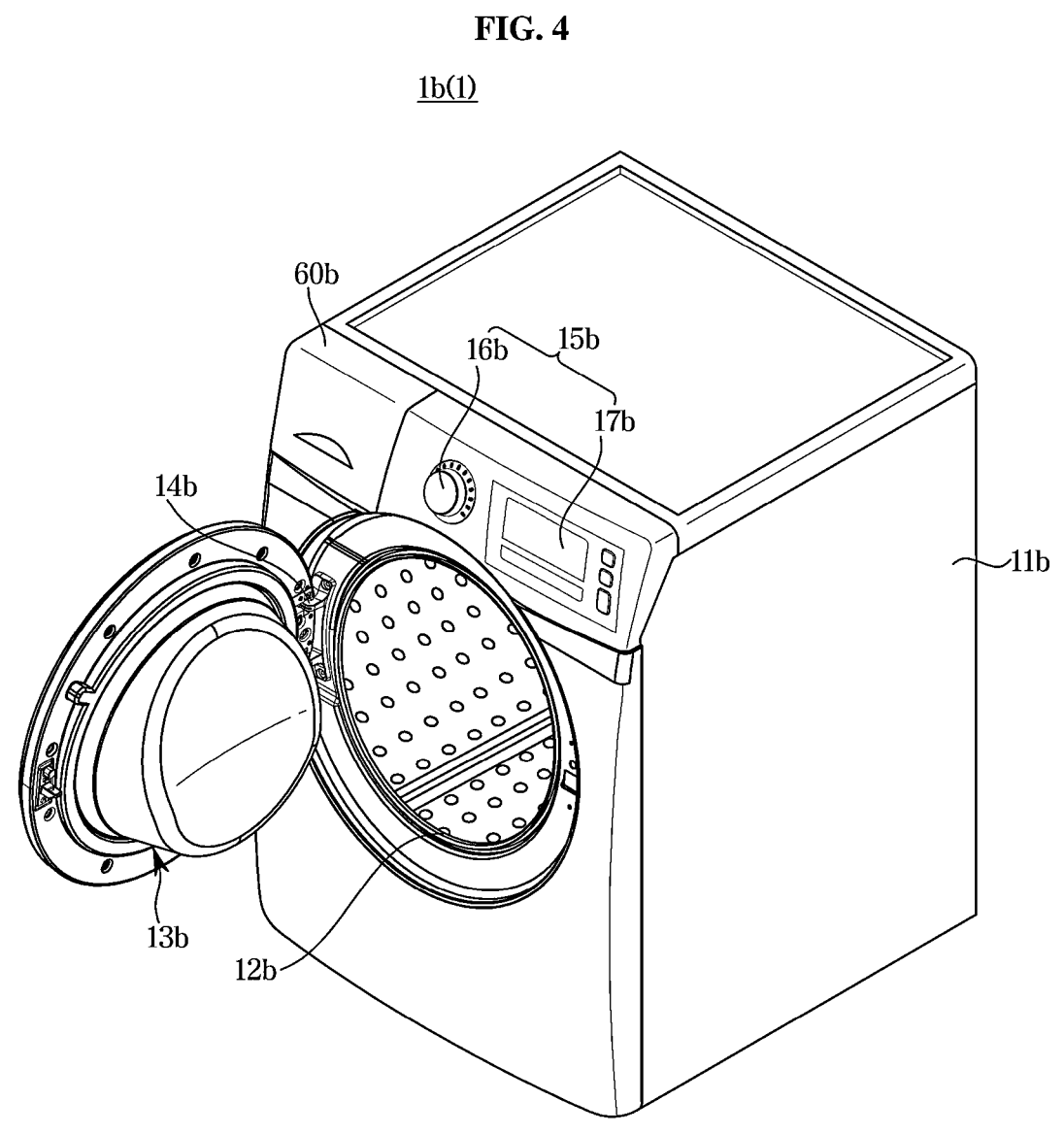
Figure 5:
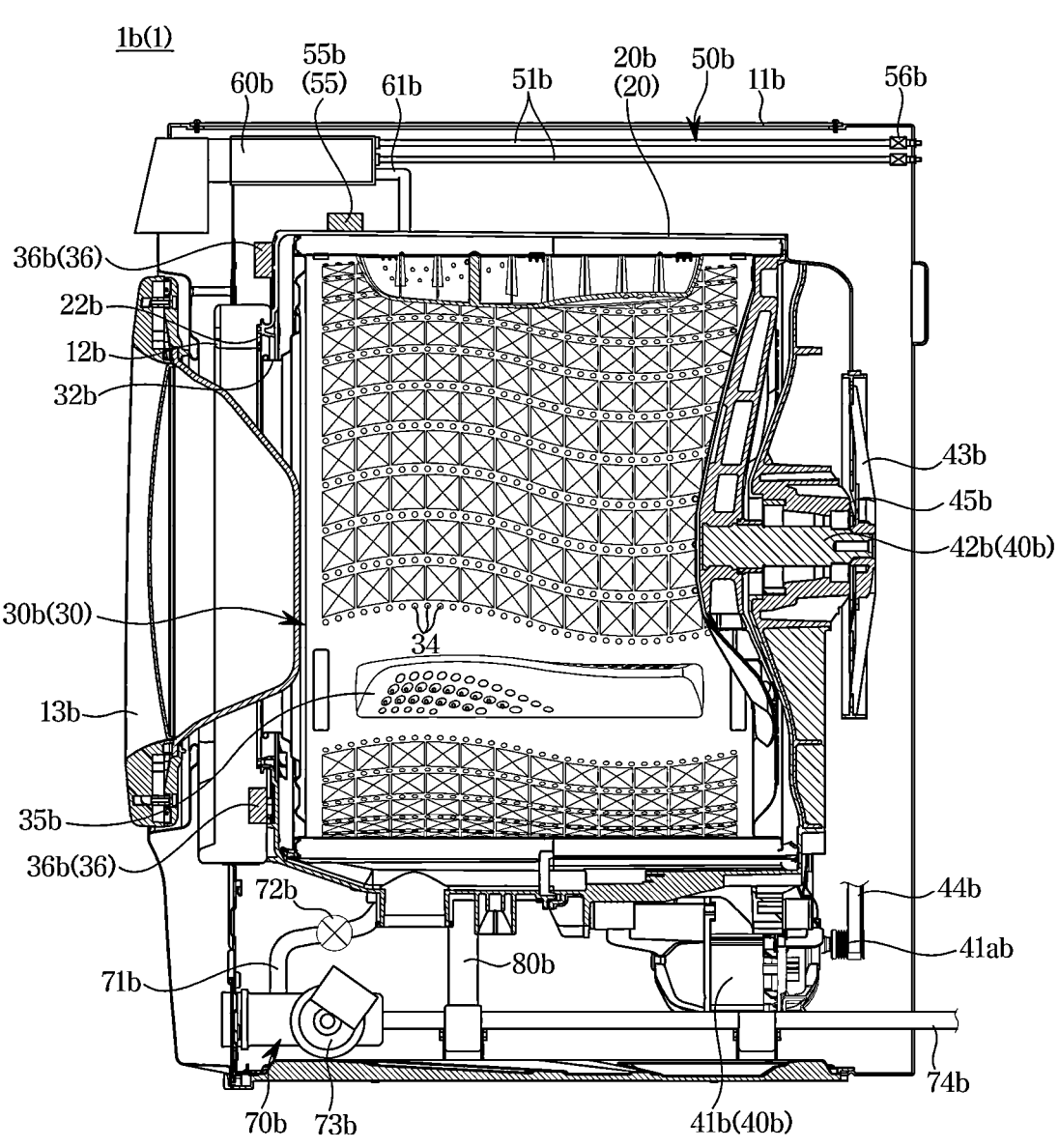
FIG. 5 is a cross-sectional view of the washing machine shown in FIG. 4.

A washing machine 1 according to an embodiment may be a top-loading washing machine 1a (see FIG. 1 and FIG. 2) or a front-loading washing machine 1b (see FIG. 4 and FIG. 5).

Figure 2:
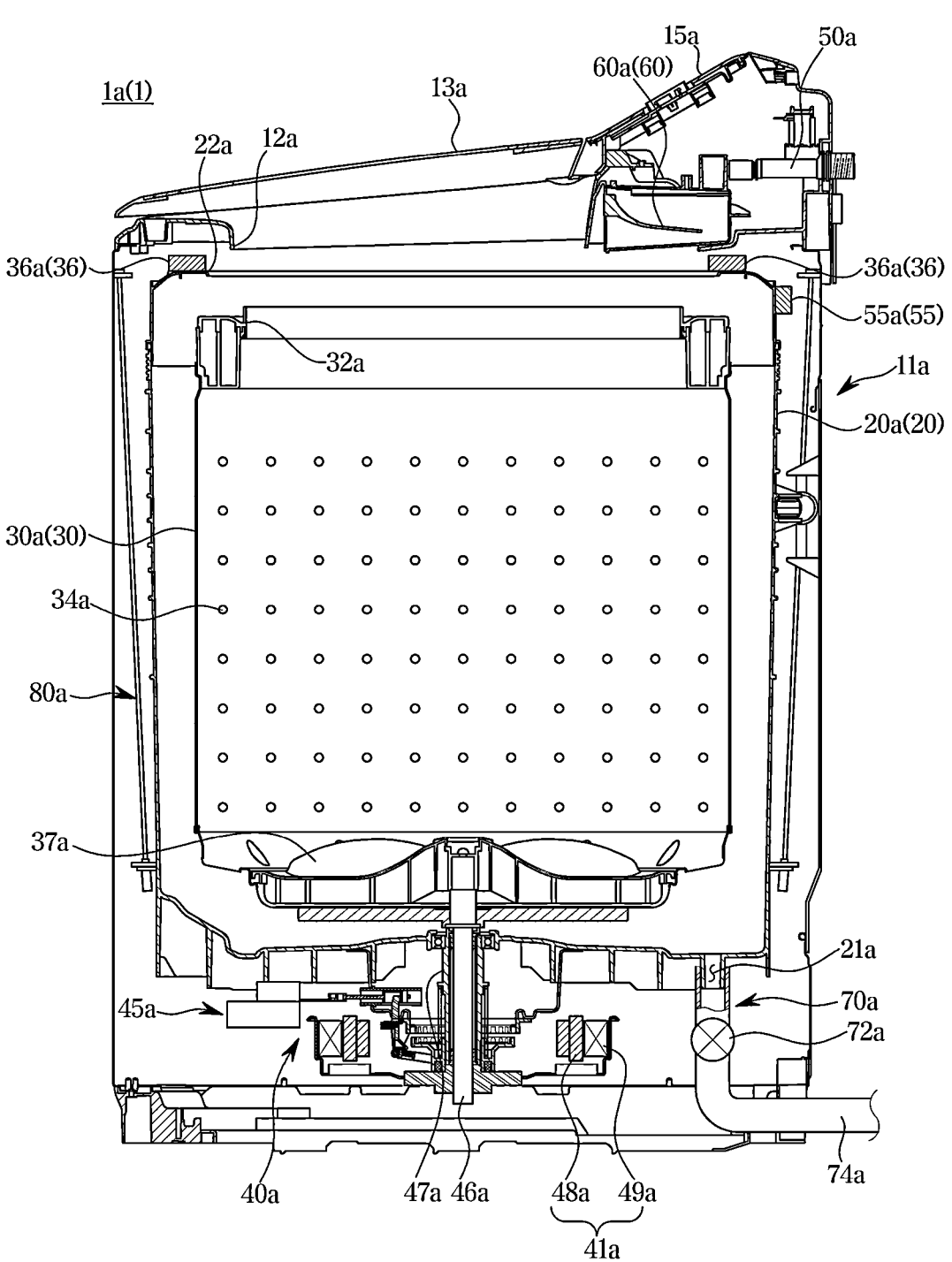
FIG. 2 is a cross-sectional view of the washing machine shown in FIG. 1.

FIG. 1 illustrates an example of an exterior of a washing machine according to an embodiment. FIG. 2 is a cross-sectional view of the washing machine shown in FIG. 1.

Referring to FIG. 1 and FIG. 2, the washing machine 1a may include a housing 11a for accommodating various components therein. The housing 11a may form an exterior of the washing machine 1a. The housing 11a may be in the form of a box with one side open.

The housing 11a may include a housing opening 12a formed to provide access to the inside of a drum 30a. The housing opening 12a may be opened substantially upwards.

The washing machine 1a may include a door 13a for opening and closing the housing opening 12a formed in the housing 11a. The door 13a may be rotatably mounted to the housing 11a by a hinge. At least a portion of the door 13a may be transparent or translucent to allow the inside of the housing to be seen.

The washing machine 1a may include a tub 20a located inside the housing 11a to store water. The tub 20a may be disposed in the housing 11a. The tub 20a may include a tub opening 22a formed to correspond to the housing opening 12a. The tub opening 22a may be opened substantially upwards. The tub 20a may be supported inside the housing 11a. The tub 20a may have a substantially cylindrical shape with one side open.

The tub 20a may be elastically supported from the housing 11a by a damper 80a. The damper 80a may connect the housing 11a and the tub 20a. The damper 80a may attenuate vibrations generated during rotation of the drum 30a by absorbing the vibration energy between the tub 20a and the housing 11a upon transferring of the vibrations to the tub 20a and/or the housing 11a.

The tub 20a may be provided with a vibration sensor 55a for detecting vibration of the tub 20a. The vibration sensor 55a may be disposed at a location capable of detecting vibration of the tub 20a.

A weight balancer 36a may be coupled to the tub 20a to prevent weight imbalance of the tub 20a. For example, the weight balancer 36a may be coupled to an upper side of the tub 20a.

The weight balancer 36a may include a housing (e.g., injection molded plastic) and a filling member (e.g., cement/concrete) filled in the housing. A member having a suitable weight to prevent weight imbalance of the tub 20a may be selected as the filling member.

The washing machine 1a may include a drum 30a to accommodate laundry. The drum 30a may be rotatably disposed inside the tub 20a. The drum 30a may perform washing, rinsing, and/or spin-drying, while rotating inside the tub 20a. The drum 30a may include a plurality of through holes 34a connecting an inner space of the drum 30a and an inner space of the tub 20a. The drum 30a may have a substantially cylindrical shape with one side open.

A pulsator 37a may be rotatably disposed at a lower portion of the drum 30a, and may generate water current (wash water stream). The laundry may be washed by the water current generated by the pulsator 37a.

The drum 30a may include a drum opening 32a formed to correspond to the housing opening 12a and the tub opening 22a. The laundry may be accommodated in the drum 30a or withdrawn from the drum 30a through the housing opening 12a, the tub opening 22a, and the drum opening 32a.

The washing machine 1a may include a driver 40a configured to rotate the drum 30a and the pulsator 37a. The driver 40a may include a motor 41a and a shaft system for transferring a driving force generated by the motor 41a to the drum 30a and the pulsator 37a.

The motor 41a may include a fixed stator 48a, and a rotor 49a that electromagnetically interacts with the stator 48a to rotate.

The shaft system may include a spin-drying shaft 47a for transferring the driving force of the motor 41a to the drum 30a, a washing shaft 46a for transferring the driving force of the motor 41a to the pulsator 37a, and a clutch 45a for connecting or disconnecting between the motor 41a and the spin-drying shaft 47a.

The spin-drying shaft 47a may have a hollow, and the washing shaft 46a may be provided in the hollow of the spin-drying shaft 47*a*. The washing shaft 46*a* may keep connected to the rotor 49*a* of the motor 41*a*, and the spin-drying shaft 47*a* may be connected to or disconnected from the rotor 49*a* of the motor 41*a* by the clutch 45*a*.

In a case where the clutch 45*a* disconnects the spin-drying shaft 47*a* from the motor 41*a*, power is transmitted only to the washing shaft 46*a* to rotate only the pulsator 37*a*. In a case where the clutch 45*a* connects the spin-drying shaft 47*a* and the motor 41*a*, power is transmitted to both the spin-drying shaft 47*a* and the washing shaft 46*a*, allowing the drum 30*a* and the pulsator 37*a* to rotate simultaneously.

In a case where only the pulsator 37*a* rotates, a wash water current may be generated by the rotation of the pulsator 37*a*, the laundry may be washed by friction with the drum 30*a* while the laundry rotates due to the generated wash water current. In a case where both the pulsator 37*a* and the drum 30*a* rotate simultaneously, moisture may be removed from the laundry by centrifugal force generated while the laundry in the drum 30*a* rotates, allowing the laundry to be spin-dried.

The washing machine 1*a* may include a water supply 50*a* to supply water to the tub 20*a*. The water supply 50*a* may be disposed above the tub 20*a*. The water supply 50*a* may include a water supply pipe, and a water supply valve arranged on the water supply pipe. The water supply pipe may be connected to an external water supply source. The water supply pipe may extend from the external water supply source to a detergent supply 60*a* and/or the tub 20*a*. Water may be supplied to the tub 20*a* through the detergent supply 60*a*. Water may be supplied to the tub 20*a* without passing through the detergent supply 60*a*.

The water supply valve may open or close the water supply pipe in response to an electrical signal. The water supply valve may allow or block the supply of water to the tub 20*a* from an external water supply source. For example, the water supply valve may include a solenoid valve configured to be open and closed in response to an electrical signal.

The washing machine 1*a* may include the detergent supplies 60*a* to supply detergent to the tub 20*a*. The detergent supply 60*a* may be configured to supply detergent into the tub 20*a* during a water supply process. Water supplied through the water supply pipe may be mixed with detergent via the detergent supply 60*a*. Water mixed with detergent may be supplied into the tub 20*a*. The term "detergent" may include, for example, laundry detergent, rinse for dryer, deodorant, sanitizer, fabric softener, bleach, and the like.

The washing machine 1*a* may include a drainage assembly 70*a* to discharge water contained in the tub 20*a* to the outside. A drain 21*a* may be formed in a lower portion of the tub 20*a* to drain water stored in the tub 20*a* to the outside of the tub 20*a*. A drain hose 74*a* may be connected to the drain 21*a*, and a drain valve 72*a* may be provided in the drain hose 74*a* to open and close the drain hose 74*a*.

The washing machine 1*a* may include a user interface 15*a* for interaction between a user and the washing machine 1*a*.

The washing machine 1*a* may include at least one user interface 15*a*. The user interface 15*a* may include at least one input interface 16*a* and at least one output interface 17*a*.

The at least one input interface 16*a* may convert sensory information received from a user into an electrical signal.

The at least one input interface 16*a* may include a power button, an operation button, a course selection dial (or a course selection button), and a washing/rinsing/spin-drying setting button. The at least one input interface 16*a* may include, for example, a tact switch, a push switch, a slide switch, a toggle switch, a micro switch, a touch switch, a touch pad, a touch screen, a jog dial, and/or a microphone.

The at least one output interface 17*a* may generate sensory information and convey various information related to operations of the washing machine 1*a* to a user.

For example, the at least one output interface 17*a* may convey information related to a washing course, operation time of the washing machine 1*a*, and washing/rinsing/spin-drying settings to the user. Information about the operation of the washing machine 1*a* may be output through a screen, an indicator, voice, or the like. The at least one output interface 17*a* may include, for example, a liquid crystal display (LCD) panel, a light emitting diode (LED) panel, or a speaker.

Figure 3:
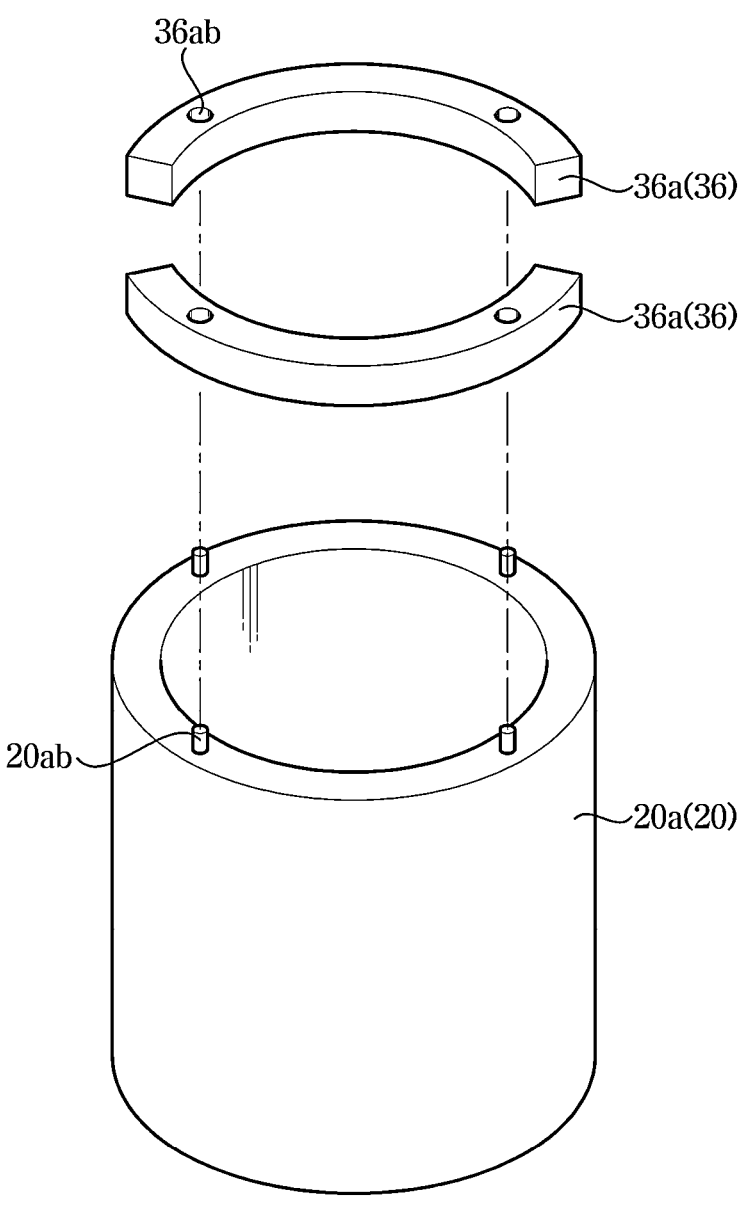
FIG. 3 is a view illustrating a weight balancer of the washing machine shown in FIG. 1.

FIG. 3 is a view illustrating a weight balancer of the washing machine shown in FIG. 1.

Referring to FIG. 3, the tub 20*a* may include a fixing protrusion 20*ab*. For example, a plurality of fixing protrusions 20*ab* may be formed on an upper side of the tub 20*a*. The plurality of fixing protrusions 20*ab* may be fastening bolts.

The weight balancer 36*a* may include fastening holes 36*ab*. By inserting the plurality of fixing protrusions 20*ab* formed on the tub 20*a* into the fastening holes 36*ab* formed on the weight balancer 36*a*, the weight balancer 36*a* may be coupled to the tub 20*a* using a nut.

A method by which the weight balancer 36*a* is coupled to the tub 20*a* is not limited thereto, and various fastening methods may be used. For example, a fixing protrusion may be provided on the weight balancer 36*a*, and a fastening hole may be provided on the tub 20*a*.

The weight balancer 36*a* may increase a weight of the tub 20*a* by being coupled to the tub 20*a*.

FIG. 4 illustrates an example of an exterior of a washing machine according to an embodiment. FIG. 5 is a cross-sectional view of the washing machine shown in FIG. 4.

Referring to FIG. 4 and FIG. 5, the washing machine 1*b* may include a washing machine housing 11*b* for accommodating various components therein. The washing machine housing 11*b* may form an exterior of the washing machine 1*b*. The washing machine housing 11*b* may be in the form of a box with one side open.

The washing machine housing 11*b* may include a housing opening 12*b* formed to provide access to the inside of a drum 30*b*. The housing opening 12*b* may be opened substantially to the front.

The washing machine 1*b* may include a door 13*b* for opening and closing the housing opening 12*b* formed in the washing machine housing 11*b*. The door 13*b* may be rotatably mounted to the washing machine housing 11*b* by a hinge 14*b*. At least a portion of the door 13*b* may be transparent or translucent to allow the inside of the washing machine housing 11*b* to be seen.

The washing machine 1*b* may include a tub 20*b* located inside the washing machine housing 11*b* to store water. The tub 20*b* may be disposed in the washing machine housing 11*b*. The tub 20*b* may include a tub opening 22*b* formed to correspond to the housing opening 12*b*. The tub opening 22*b* may be opened substantially to the front. The tub 20*b* may be supported inside the washing machine housing 11*b*. The tub 20*b* may have a substantially cylindrical shape with one side open.

The tub 20*b* may be elastically supported from the washing machine housing 11*b* by a damper 80*b*. The damper 80*b* may connect the washing machine housing 11*b* and the tub 20*b*. The damper 80*b* may attenuate vibrations generated during rotation of the drum 30*b* by absorbing the vibration energy between the tub 20*b* and the washing machine housing 11*b* upon transferring of the vibrations to the tub 20*b* and/or the washing machine housing 11*b*.

The tub 20*b* may be provided with a vibration sensor 55*b* for detecting vibration of the tub 20*b*. The vibration sensor 55*b* may be disposed at a location capable of detecting vibration of the tub 20*b*.

A weight balancer 36*b* may be coupled to the tub 20*b* to prevent weight imbalance of the tub 20*b*. For example, the weight balancer 36*b* may be coupled to a front side of the tub 20*b*.

The weight balancer 36*b* may include a housing (e.g., injection molded plastic) and a filling member (e.g., cement/concrete) filled in the housing. A member having a suitable weight to prevent weight imbalance of the tub 20*b* may be selected as the filling member.

The washing machine 1*b* may include a drum 30*b* to accommodate laundry. The drum 30*b* may be rotatably disposed inside the tub 20*b*. The drum 30*b* may perform washing, rinsing, and/or spin-drying, while rotating inside the tub 20*b*. The drum 30*b* may include a plurality of through holes 34*b* connecting an inner space of the drum 30*b* and an inner space of the tub 20*b*. The drum 30*b* may have a substantially cylindrical shape with one side open. At least one lifter 35*b* may be installed on an inner circumference of the drum 30*b* to lift and drop laundry during rotation of the drum 30*b*.

The drum 30*b* may include a drum opening 32*b* formed to correspond to the housing opening 12*b* and the tub opening 22*b*. The laundry may be accommodated in the drum 30*b* or withdrawn from the drum 30*b* through the housing opening 12*b*, the tub opening 22*b*, and the drum opening 32*b*.

The washing machine 1*b* may include a driver 40*b* configured to rotate the drum 30*b*. The driver 40*b* may include a motor 41*b* and a rotating shaft 42*b* for transmitting a driving force generated by the motor 41*b* to the drum 30*b*. The rotating shaft 42*b* may penetrate the tub 20*b* and be connected to the drum 30*b*.

The washing machine 1*b* may be divided into a direct driving type in which the rotating shaft 42*b* is directly connected with the motor 41*b* to rotate the drum 30*b*, and an indirect driving type in which a pulley 43*b* is connected between the motor 41*b* and the rotating shaft 42*b* to drive the drum 30*b*.

The washing machine 1*b* according to an embodiment may be a washing machine of the indirect driving type, without being limited thereto. That is, the washing machine 1*b* according to an embodiment may be a washing machine of the direct driving type.

One end of the rotating shaft 42*b* may be connected to the drum 30, and the other end of the rotating shaft 42*b* may be connected to the pulley 43*b* to receive a driving force from the motor 41*b*. A motor pulley 41*ab* may be formed on a rotating shaft of the motor 41*b*. A driving belt 44*b* may be provided between the motor pulley 41*ab* and the pulley 43*b*, and the rotating shaft 42*b* may be driven by the driving belt 44*b*.

In the rear portion of the tub 20*b*, a bearing housing 45*b* for rotatably supporting the rotating shaft 42*b* may be installed. The bearing housing 45*b* may be made of an aluminum alloy. The bearing housing 45*b* may be inserted into the rear portion of the tub 20*b* upon injection-molding of the tub 20*b*.

The driver 40*b* may rotate the drum 30*b* forward or backward to perform washing, rinsing, spin-drying, and/or drying operations.

The washing machine 1*b* may include a water supply 50*b* to supply water to the tub 20*b*. The water supply 50*b* may be disposed above the tub 20*b*. The water supply 50*b* may include a water supply pipe 51*b*, and a water supply valve 56*a* arranged on the water supply pipe 51*b*. The water supply pipe 51*b* may be connected to an external water supply source. The water supply pipe 51*b* may extend from the external water supply source to a detergent supply 60*b* and/or the tub 20*b*. Water may be supplied to the tub 20*b* through the detergent supply 60*b*. Water may be supplied to the tub 20*b* without passing through the detergent supply 60*b*.

The water supply valve 56*b* may open or close the water supply pipe 51*b* in response to an electrical signal. The water supply valve 56*b* may allow or block the supply of water to the tub 20*b* from an external water supply source. For example, the water supply valve 56*b* may include a solenoid valve configured to be open and closed in response to an electrical signal.

The washing machine 1*b* may include the detergent supplies 60*b* to supply detergent to the tub 20*b*. The detergent supply 60*b* may be configured to supply detergent to the tub 20*b* during a water supply process. Water supplied through the water supply pipe 51*b* may be mixed with detergent via the detergent supply 60*b*. Water mixed with detergent may be supplied into the tub 20*b*. The term "detergent" may include, for example, laundry detergent, rinse for dryer, deodorant, sanitizer, fabric softener, bleach, and the like. The detergent supply 60*b* may be connected to the tub 20*b* through a connection pipe 61*b*.

The washing machine 1*b* may include a drainage assembly 70*b* to discharge water contained in the tub 20*b* to the outside. The drainage assembly 70*b* may include a drain pump 73*b* for discharging water from the tub 20*b* to the outside of the washing machine housing 11*b*, a connection hose 71*b* for connecting the tub 20*b* and the drain pump 73*b* to allow water in the tub 20*b* to flow into the drain pump 73*b*, and a drain hose 74*b* for guiding the water pumped by the drain pump 73*b* to the outside of the washing machine housing 11*b*. The drainage assembly 70*b* may include a drain valve 72*b* arranged on the connection hose 71*b* to open and close the connection hose 71*b*.

The washing machine 1*b* may include a user interface 15*b* for interaction between a user and the washing machine 1*b*.

The washing machine 1*b* may include at least one user interface 15*b*. The user interface 15*b* may include at least one input interface 16*b* and at least one output interface 17*b*.

The at least one input interface 16*b* may convert sensory information received from a user into an electrical signal.

The at least one input interface 16*b* may include a power button, an operation button, a course selection dial (or a course selection button), and a washing/rinsing/spin-drying setting button. The at least one input interface 16*b* may include, for example, a tact switch, a push switch, a slide switch, a toggle switch, a micro switch, a touch switch, a touch pad, a touch screen, a jog dial, and/or a microphone.

The at least one output interface 17*b* may generate sensory information and convey various information related to operations of the washing machine 1*b* to a user.

For example, the at least one output interface 17*b* may convey information related to a washing course, operation time of the washing machine 1*b*, and washing/rinsing/spin-drying settings to the user. Information about the operation of the washing machine 1*b* may be output through a screen, an indicator, voice, or the like. The at least one output interface 17*b* may include, for example, a liquid crystal display (LCD) panel, a light emitting diode (LED) panel, or a speaker.

Figure 6:
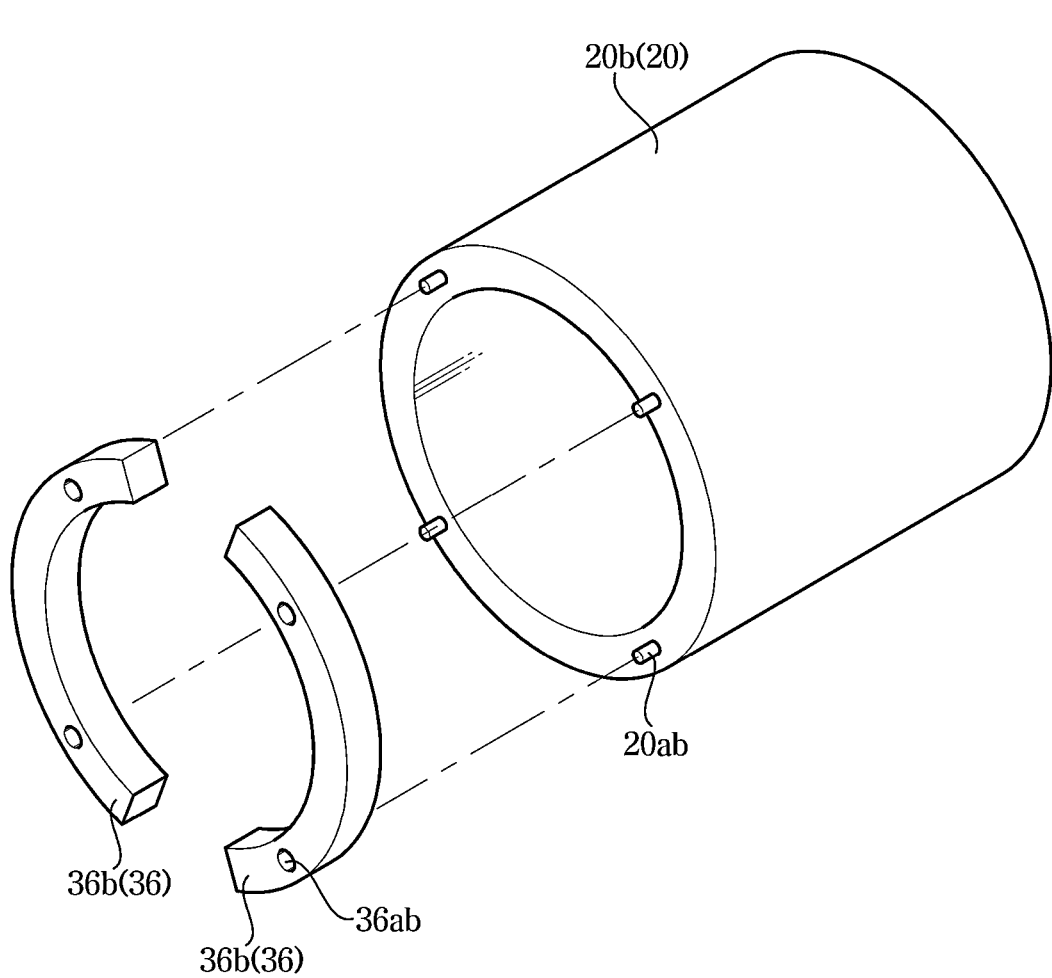
FIG. 6 is a view illustrating a weight balancer of the washing machine shown in FIG. 4.

FIG. 6 is a view illustrating a weight balancer of the washing machine shown in FIG. 4.

Referring to FIG. 6, the tub 20*b* may include the fixing protrusion 20*ab*. For example, a plurality of fixing protrusions 20*ab* may be formed on a front of the tub 20*b*. The plurality of fixing protrusions 20*ab* may be fastening bolts.

The weight balancer 36*b* may include the fastening holes 36*ab*. By inserting the plurality of fixing protrusions 20*ab* formed on the tub 20*b* into the fastening holes 36*ab* formed on the weight balancer 36*b*, the weight balancer 36*b* may be coupled to the tub 20*b* using a nut.

A method by which the weight balancer 36*b* is coupled to the tub 20*b* is not limited thereto, and various fastening methods may be used. For example, a fixing protrusion may be provided on the weight balancer 36*b*, and a fastening hole may be provided on the tub 20*b*.

The weight balancer 36*b* may increase a weight of the tub 20*b* by being coupled to the tub 20*b*.

Figure 7:
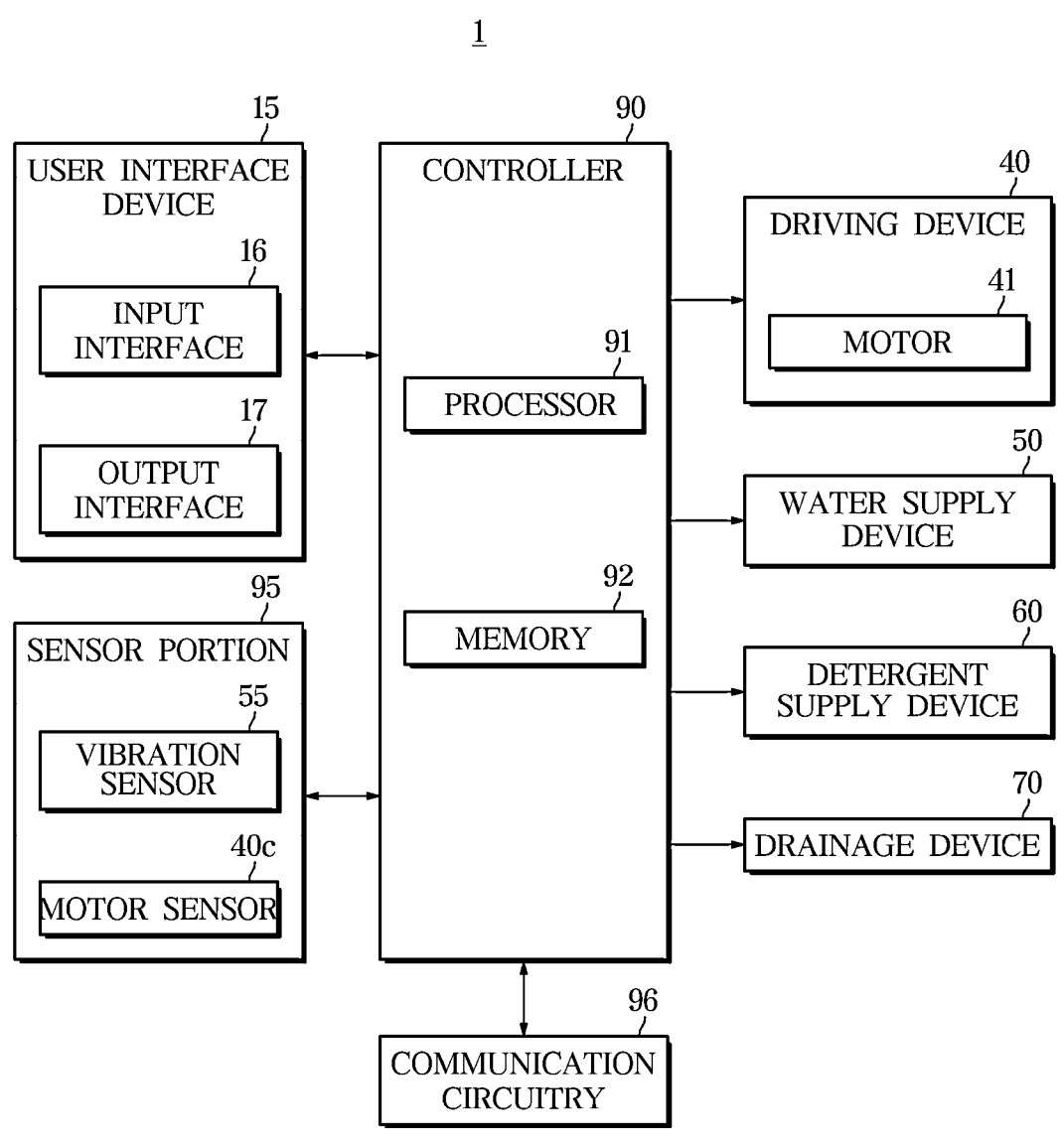
FIG. 7 is a control block diagram of an example of a washing machine according to an embodiment.

FIG. 7 is a control block diagram of an example of a washing machine according to an embodiment.

Referring to FIG. 7, in an embodiment, the washing machine 1 may include the user interface (15; 15*a*, 15*b*), the driver (40; 40*a*, 40*b*), the water supply (50; 50*a*, 50*b*), the detergent supply (60; 60*a*, 60*b*), the drainage assembly (70; 70*a*, 70*b*), sensors 95, a communication circuitry 96, and/or a controller 90.

The user interface 15 may provide a user interface for interaction between a user and the washing machine 1.

The user interface 15 may include the at least one input interface (16; 16*a*, 16*b*) and the at least one output interface (17; 17*a*, 17*b*).

The at least one input interface 16 may convert sensory information received from the user into an electrical signal.

The at least one input interface 16 may include a power button, an operation button, a course selection dial (or course selection button), and a washing/rinsing/spin-drying setting button. The at least one input interface 16 may include, for example, a tact switch, a push switch, a slide switch, a toggle switch, a micro switch, a touch switch, a touch pad, a touch screen, a jog dial, and/or a microphone, and the like.

The at least one output interface 17 may generate sensory information and convey various information related to operations of the washing machine 1 to the user.

For example, the at least one output interface 17 may convey information related to a washing course, operation time of the washing machine, and washing/rinsing/spin-drying settings to the user. Information about the operation of the washing machine 1 may be output through a screen, an indicator, voice, or the like. The at least one output interface 17 may include, for example, a liquid crystal display (LCD) panel, a light emitting diode (LED) panel, or a speaker.

The driver (40; 40*a*, 40*b*) may include the motor (41; 41*a*, 41*b*) that provides a driving force to rotate the drum (30; 30*a*, 30*b*), and a driving circuitry that drives the motor 41. The motor 41 may operate based on a driving current supplied from the driving circuitry. The driver 40 may operate based on a control signal from the controller 90.

The water supply (50; 50*a*, 50*b*) may include the water supply valve (56*a*, 56*b*) that may open and close the water supply pipe (51*a*, 51*b*) extending from an external water source to the detergent supply (60; 60*a*, 60*b*) and/or the tub (20; 20*a*, 20*b*). The water supply valve (56*a*, 56*b*) may be opened or closed based on a control signal from the controller 90.

The detergent supply (60; 60*a*, 60*b*) may supply detergent into the tub 20 during a water supply process.

The drainage assembly (70; 70*a*, 70*b*) may include the drain pump (73*a*, 73*b*) for discharging water in the tub 20 to the outside of the washing machine housing (11*a*, 11*b*). The drain pump (73*a*, 73*b*) may operate based on a control signal from the controller 90.

The sensors 95 may include at least one sensor for obtaining information related to an operation state of the washing machine 1. The sensors 95 may transmit sensor data collected by the at least one sensor to the controller 90.

In an embodiment, the sensors 95 may include the vibration sensor (55; 55*a*, 55*b*) that detects vibration of the tub 20.

The vibration sensor 55 may detect vibration of the tub 20. The vibration sensor 55 may detect rotational vibration of the tub 20. The vibration sensor 55 may detect at least one of an x-axis angular speed, y-axis angular speed, or z-axis angular speed of the tub 20.

The vibration sensor 55 may be an 1-axis gyro sensor detecting one of the x-axis angular speed, y-axis angular speed, or z-axis angular speed of the tub 20.

The vibration sensor 55 may be a 2-axis gyro sensor detecting two of the x-axis angular speed, y-axis angular speed, or z-axis angular speed of the tub 20.

The vibration sensor 55 may be a 6-axis microelectromechanical systems (MEMS) sensor, or a 3-axis gyro sensor detecting all of the x-axis angular speed, y-axis angular speed, and z-axis angular speed of the tub 20.

The vibration sensor 55 may collect sensor data about the rotational vibration of the tub 20.

For example, the vibration sensor 55 may obtain an angular speed of the rotation axis corresponding to the rotational vibration of the tub 20.

During a washing cycle (e.g., spin-drying process), vibration may occur in the tub 20 due to the rotation of the drum 30. More specifically, eccentricity of the drum 30 may occur due to unbalance of the laundry in the drum 30, and vibration of the tub 20 may occur due to the eccentricity of the drum 30. In a case where a rotation speed of the drum 30 increases while the laundry is unbalanced, the vibration of the tub 20 may increase, and noise may also increase due to the vibration of the tub 20. The occurrence of eccentricity in the drum 30 may include the amount of eccentricity of the drum 30 being greater than or equal to a preset value.

According to various embodiments, the sensors 95 may further include a motor sensor 40*c* detecting an operation state of the driver 40.

The motor sensor 40*c* may include, but is not limited to, a current sensor measuring a driving current applied to the motor 41 and/or a torque sensor measuring a torque load of the motor 41.

In an embodiment, the controller 90 may determine an unbalance value of the laundry in the drum 30 based on an output value of the motor sensor 40*c*.

For example, the controller 90 may determine the unbalance value of the laundry in the drum 30 based on a driving current applied to the motor 41.

In response to the driving current applied to the motor 41 being less than a defined value, the controller 90 may determine that the unbalance value of the laundry is less than a reference value. In response to the driving current applied to the motor 41 is greater than or equal to the defined value, it may be determined that the unbalance value of the laundry is greater than or equal to the reference value. The reference value may be an allowable unbalance value for moving on to a subsequent spin-drying process from a section where a preset speed (e.g., 100 rpm) is maintained.

In response to the unbalance value of the laundry being greater than or equal to the reference value, the controller 90 may estimate that a large eccentricity has occurred in the drum 30 due to the laundry. In response to the amount of eccentricity caused by laundry in the drum 30 being greater than or equal to a preset value, abnormal vibration occurs in the tub 20. In this instance, the controller 90 may restart the spin-drying process from the beginning.

In response to the unbalance value of the laundry being less than the reference value, the controller 90 may estimate that a small eccentricity has occurred in the drum 30 due to the laundry. In this instance, the controller 90 may proceed to a subsequent spin-drying process. That is, the drum 30 may be accelerated and rotated at a maximum rotation speed.

As another example, the controller 90 may determine an unbalance value of laundry in the drum 30 based on a torque of the motor 41.

In response to the torque of the motor 41 being less than a defined value, the controller 90 may determine that the unbalance value of the laundry is less than the reference value. In response to the torque of the motor 41 being greater than or equal to the defined value, it may be determined that the unbalance value of the laundry is greater than or equal to the reference value.

In an embodiment, the controller 90 may obtain at least one of the x-axis angular speed, y-axis angular speed, or z-axis angular speed of the tub 20 based on sensor data that is the output value of the vibration sensor 55.

To this end, the memory 92 may store instructions for converting the sensor data output from the vibration sensor 55 into at least one of the x-axis angular speed, y-axis angular speed, or z-axis angular speed of the tub 20.

The controller 90 may obtain an angular speed of at least one rotation axis of the tub 20 based on processing the output value of the vibration sensor 55. For example, the controller 90 may obtain at least one of the x-axis angular speed, y-axis angular speed, or z-axis angular speed of the tub 20 based on the output value of the vibration sensor 55.

In an embodiment, the controller 90 may determine whether the weight balancer 36 is damaged based on the angular speed of at least one rotation axis of the tub 20.

The controller 90 may determine that the weight balancer 36 is damaged based on the angular speed of at least one rotation axis of the tub 20 being greater than a preset angular speed.

In an embodiment, damage to the weight balancer 36 may include the weight balancer 36 not being properly coupled to the tub 20 (e.g., the fastening bolt is misaligned) and/or damage to a filling member of the weight balancer 36.

In a case where the drum 30 rotates continuously while the weight balancer 36 is damaged and vibration occurs in the tub 20, the damage to the weight balancer 36 may worsen and a loud noise may be generated, or the washing machine 1 may be damaged.

According to the disclosure, whether the weight balancer 36 is damaged may be determined based on the angular speed of at least one rotation axis of the tub 20, thereby preventing deterioration of the weight balancer 36 in advance.

Furthermore, according to the disclosure, by determining whether the weight balancer 36 is damaged based on the angular speed of at least one rotation axis of the tub 20, a cause of vibration in the tub 20 may be more accurately identified.

A detailed method of determining whether the weight balancer 36 is damaged based on an angular speed of at least one rotation axis of the tub 20 is described later.

The sensors 95 is not limited to the above-described examples, and the sensors 95 may further include various types of sensors that obtain information related to an operation state of the washing machine 1.

For example, the sensors 95 may include at least one of a water level sensor detecting a water level of the tub, a flow rate sensor detecting a flow rate flowing into the tub 20 through the water supply 50, or a sensor detecting an operation state of the drainage assembly 70.

For example, the sensor detecting the operation state of the drainage assembly 70 may include a current sensor measuring a driving current applied to the drain pump 73, but is not limited thereto.

The washing machine 1 may include the communication circuitry 96 for communicating with external devices (e.g., a server, a user device, and/or home appliances) by wire and/or wirelessly.

The communication circuitry 96 may include at least one of a short-range communication module or a long-range communication module.

The communication circuitry 96 may transmit data to an external device or receive data from the external device. For example, the communication circuitry 96 may establish communication with a server, a user device, and/or another home appliance, and transmit and receive various data.

For the communication, the communication circuitry 96 may establish a direct (e.g., wired) communication channel or a wireless communication channel between external devices, and support the performance of the communication through the established communication channel. According to an embodiment, the communication circuitry 96 may include a wireless communication module (e.g., a cellular communication module, a short-range wireless communication module, or a global navigation satellite system (GNSS) communication module) or a wired communication module (e.g., a local area network (LAN) communication module, or a power line communication module). Among these communication modules, the corresponding communication module may communicate with an external device through a first network (e.g., a short-range wireless communication network such as Bluetooth, wireless fidelity (Wi-Fi) direct, or infrared data association (IrDA)) or a second network (e.g., a long-range wireless communication network such as a legacy cellular network, a 5G network, a next-generation communication network, the Internet, or a computer network (e.g., LAN or WAN)). These various types of communication modules may be integrated as one component (e.g., a single chip) or implemented as a plurality of separate components (e.g., multiple chips).

The short-range wireless communication module may include a Bluetooth communication module, a Bluetooth Low Energy (BLE) communication module, a near field communication module, a WLAN (Wi-Fi) communication module, and a Zigbee communication module, an infrared data association (IrDA) communication module, a Wi-Fi Direct (WFD) communication module, an ultrawideband (UWB) communication module, an Ant+ communication module, a microwave (uWave) communication module, etc., but is not limited thereto.

The long-range wireless communication module may include a communication module that performs various types of long-range wireless communication, and may include a mobile communication circuitry. The mobile communication circuitry transmits and receives radio signals with at least one of a base station, an external terminal, or a server on a mobile communication network.

In an embodiment, the communication circuitry 96 may communicate with an external device such as a server, a user device, another home appliance, and the like, through an access point (AP). The AP may connect a local area network (LAN), to which the washing machine 1, another home appliance and/or a user device is connected, to a wide area network (WAN) to which a server is connected. The washing machine 1, the other home appliance and/or the user device may be connected to the server through the wide area network (WAN).

The controller 90 may control various components of the washing machine 1 (e.g., the driver 40, the water supply 50, the detergent supply 60, and the drainage assembly 70). The controller 90 may control various components of the washing machine 1 to perform at least one process including water supply, washing, rinsing, and/or spin-drying according to user input. For example, the controller 90 may control the motor 41 of the driver 40 to adjust a rotation speed of the drum 30, control the water supply valve (56a, 56b) of the water supply 50 to supply water to the tub 20, control the detergent supply 60 to supply detergent to the tub 20, or control the drain pump (73a, 73b) of the drainage assembly 70 to discharge water from the tub 20 to the outside.

The controller 90 may include hardware, such as a central processing unit (CPU), Micom, or memory, and software such as a control program. For example, the controller 90 may include at least one memory 92 that stores data in the form of a program or an algorithm for controlling operations of components in the washing machine 1, and at least one processor 91 that performs the above-described operations and operations to be described below using the data stored in the at least one memory 92. The memory 92 and the processor 91 may be implemented as separate chips. The processor 91 may include one or two or more processor chips or one or two or more processing cores. The memory 92 may include one or two or more memory chips or one or two or more memory blocks. In addition, the memory 92 and processor 91 may be implemented as a single chip.

The at least one memory 92 may store a cycle profile corresponding to a washing course, operation time of the washing machine, and washing/rinsing/spin-drying settings. The cycle profile may include a rotation speed of the drum 30 during a spin-drying process.

For example, the controller 90 may be mounted on a printed circuit board provided on a rear side of a control panel, which is an example of the user interface 15.

The controller 90 may be electrically connected to the user interface 15, the driver 40, the water supply 50, the detergent supply 60, the drainage assembly 70, the sensors 95, and/or the communication circuitry 96.

Figure 8:
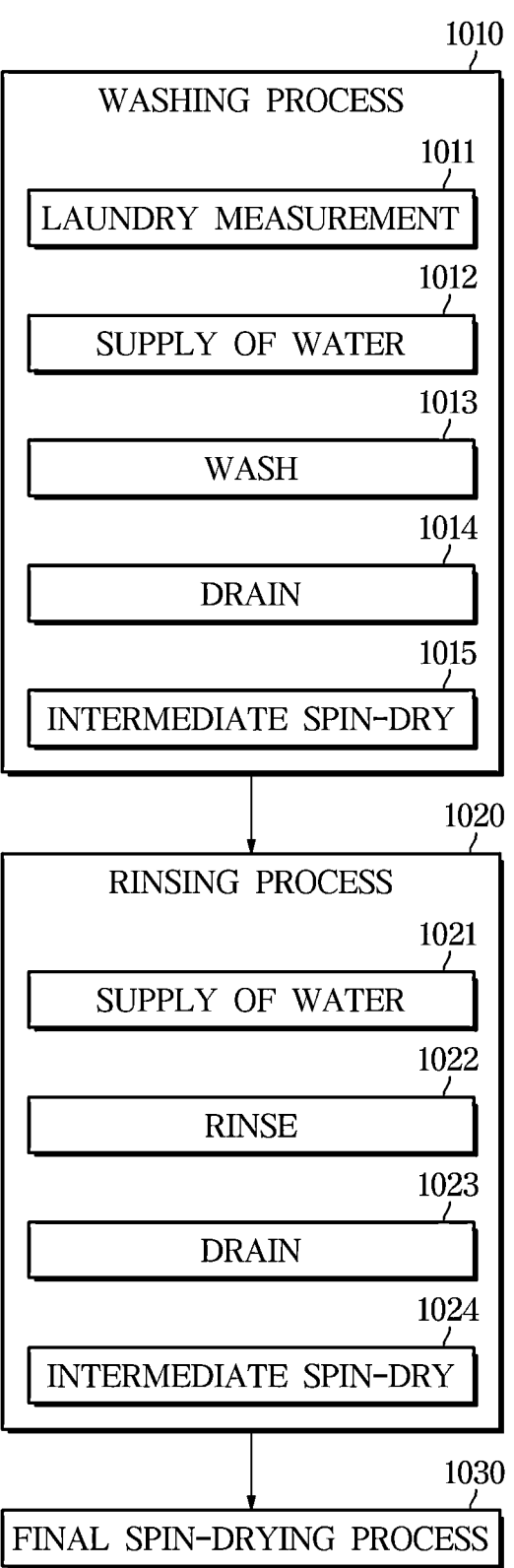
FIG. 8 illustrates an example of a washing cycle of a washing machine according to an embodiment.

FIG. 8 illustrates an example of a washing cycle of a washing machine according to an embodiment.

Referring to FIG. 8, the washing machine 1 may sequentially perform a washing process 1010, a rinsing process 1020, and a spin-drying process 1030 according to a course selected by a user input.

The memory 92 may record/store data including a program for controlling washing operations according to a washing course and washing settings according to the washing course.

The program for controlling the washing operations according to the washing course may include profiles of the washing process 1010, the rinsing process 1020, and/or the final spin-drying process 1030.

The profiles of the washing process 1010, the rinsing process 1020, and/or the final spin-drying process 1030 may include operation profiles of the driver 40, the water supply 50, the detergent supply 60, and/or the drainage assembly 70. For example, the profiles of the washing process 1010, the rinsing process 1020, and/or the final spin-drying process 1030 may include profiles for a target rotation speed of the drum 30 in spin-drying processes 1015, 1024, and 1030.

The washing process 1010 may include a laundry measurement 1011 for measuring the amount of laundry, a supply of water 1012 for supplying water to the tub 20, a wash 1013 for washing the laundry by rotating the drum 30 at low speed, a drain 1014 for discharging water accommodated in the tub 20, and an intermediate spin-dry 1015 for separating water from the laundry by rotating the drum 30 at high speed.

For the wash 1013, the controller 90 may control the driver 40 to rotate the motor 41 forward (e.g., clockwise direction) or backward (e.g., counterclockwise direction). By the rotation of the drum 30, the laundry falls from an upper side of the drum 30 to a lower side, and thus the laundry may be washed by falling.

For the intermediate spin-dry 1015, the controller 90 may control the driver 40 to rotate the motor 41 at high speed. By the high-speed rotation of the drum 30, water may be separated from the laundry accommodated in the drum 30, and thus discharged to the outside of the washing machine 1.

During the intermediate spin-dry 1015, the rotation speed of the drum 30 may be increased gradually.

By the rinsing process 1020, the laundry may be rinsed. Specifically, detergent or foreign substances left in the laundry may be washed away with water.

The rinsing process 1020 may include a supply of water 1021 for supplying water to the tub 20, a rinse 1022 for rinsing the laundry by driving the drum 30, a drain 1023 for discharging the water accommodated in the tub 20, and an intermediate spin-dry 1024 for separating water from the laundry by driving the drum 30.

The supply of water 1021, the drain 1023, and the intermediate spin-dry 1024 of the rinsing process 1020 may be the same as the supply of water 1012, the drain 1014, and intermediate spin-dry 1015 of the washing process 1010, respectively. During the rinsing process 1020, the supply of water 1021, the rinse 1022, the drain 1023, and the intermediate spin-dry 1024 may be performed once or multiple times.

By the final spin-drying process 1030, the laundry may be dehydrated. Specifically, water may be separated from the laundry by the high-speed rotation of the drum 30, and the separated water may be discharged to the outside of the washing machine 1.

The final spin-drying process 1030 may include a final spin-drying in which the drum 30 is rotated at a higher speed than in the intermediate spin-dry 1015 and 1024 to separate water from the laundry. Because of the final spin-dry 1031, the last intermediate spin-dry 1024 of the rinsing process 1020 may be omitted.

For the final spin-drying process 1030, the controller 90 may control the driver 40 to rotate the motor 41 at high speed. By the high-speed rotation of the drum 30, water may be separated from the laundry accommodated in the drum 30 and discharged to the outside of the washing machine 1. In addition, the rotation speed of the motor 41 may be increased gradually.

Because the operation of the washing machine 1 ends with the final spin-drying process 1030, an operation time of the final spin-drying process 1030 may be longer than that of the intermediate spin-dry 1015 and 1024.

As described above, the washing machine 1 may perform the washing process 1010, the rinsing process 1020, and the final spin-drying process 1030 to wash the laundry. In particular, during the intermediate spin-dry 1015 and 1024 and the final spin-drying process 1030, the washing machine 1 may gradually increase the rotation speed of the motor 41 that rotates the drum 30.

The spin-drying process described throughout the specification may include the intermediate spin-dry 1015 performed in the washing process 1010, the intermediate spin-dry 1024 performed in the rinsing process 1020, and/or the final spin-drying process 1030.

Figure 9:
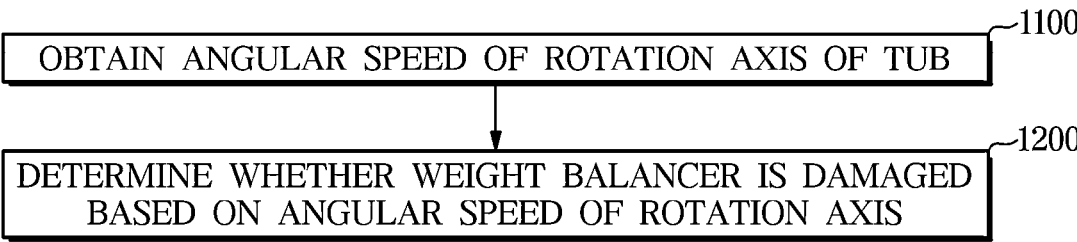
FIG. 9 is a flowchart illustrating an example of a method for controlling a washing machine according to an embodiment.

FIG. 9 is a flowchart illustrating an example of a method for controlling a washing machine according to an embodiment.

Referring to FIG. 9, the controller 90 may obtain an angular speed of a rotation axis of the tub 20 based on an output value of the vibration sensor 55 (1100).

Sensor data output from the vibration sensor 55 may include at least one signal of an x-axis angular speed signal, a y-axis angular speed signal, or a z-axis angular speed signal of the tub 20.

The controller 90 may obtain at least one of an x-axis angular speed, a y-axis angular speed, or a z-axis angular speed of the tub 20 based on the at least one signal of the x-axis angular speed signal, the y-axis angular speed signal, or the z-axis angular speed signal of the tub 20.

Figure 10:
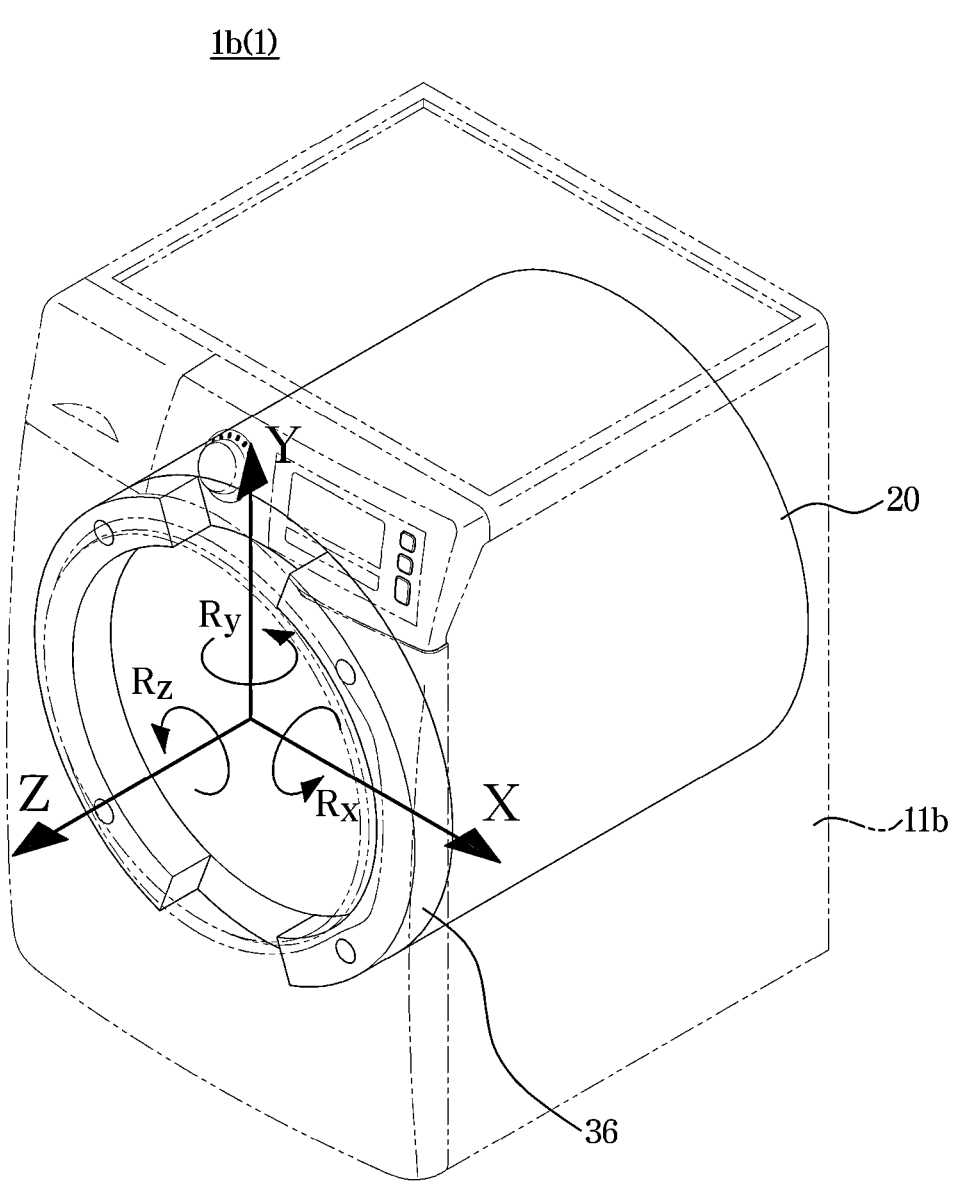
FIG. 10 is a view illustrating an example of a rotation axis and a rotational direction of a tub in a washing machine according to an embodiment.

FIG. 10 is a view illustrating an example of a rotation axis and a rotational direction of a tub in a washing machine according to an embodiment.

Referring to FIG. 10, the tub 20 of the washing machine 1 may rotate in the x-axis, y-axis, and z-axis directions.

The vibration sensor 55 may collect angular speed information of the tub 20.

That is, the vibration sensor 55 may collect angular speed information of three axes (x-axis, y-axis, and z-axis).

The vibration sensor 55 may be a gyro sensor that measures an angular speed using the Coriolis force generated when a mass is driven in one direction and rotated in a direction perpendicular to the drive.

The vibration sensor 55 may include a mass driven in the x-axis direction, a mass driven in the y-axis direction, and a mass driven in the z-axis direction to detect angular speeds in the three axes. An x-axis angular speed Rx rotating in the x-axis direction may be detected by the mass driven in the x-axis direction. A y-axis angular speed Ry rotating in the y-axis direction may be detected by the mass driven in the y-axis direction. A z-axis angular speed Rz rotating in the z-axis direction may be detected by the mass driven in the z-axis direction.

The angular speeds of the three axes of the x-axis, y-axis, and z-axis detected by the vibration sensor 55 may also be referred to as roll, pitch, and yaw, respectively.

Specifically, the rotation of the tub 20 about the x-axis may be referred to as roll, the rotation about the y-axis may be referred to as pitch, and the rotation about the z-axis may be referred to as yaw.

Referring again to FIG. 9, the controller 90 may determine whether the weight balancer 36 is damaged based on the angular speed of the rotation axis of the tub 20 (1200).

For example, the controller 90 may determine that the weight balancer 36 is damaged in a case where the x-axis angular speed Rx is greater than a preset angular speed Rx_ref.

In addition, the controller 90 may determine that the weight balancer 36 is damaged in a case where the y-axis angular speed Ry is greater than a preset angular speed Ry_ref.

In addition, the controller 90 may determine that the weight balancer 36 is damaged in a case where the z-axis angular speed Rz is greater than a preset angular speed Rz_ref. In this instance, the preset angular speeds Rx_ref, Ry_ref, and Rz_ref may be preset for determining damage to the weight balancer 36, and may be different from each other or the same value.

According to various embodiments, in order to improve a reliability of estimating damage to the weight balancer 36, the controller 90 may determine that the weight balancer 36 is damaged in a case where at least two of the x-axis angular speed Rx, y-axis angular speed Ry, or z-axis angular speed Rz are greater than the respective preset angular speed. For example, the controller 90 may determine that the weight balancer 36 is damaged based on the x-axis angular speed Rx being greater than the preset angular speed Rx_ref and the z-axis angular speed Rz being greater than the preset angular speed Rz_ref.

Figure 11:
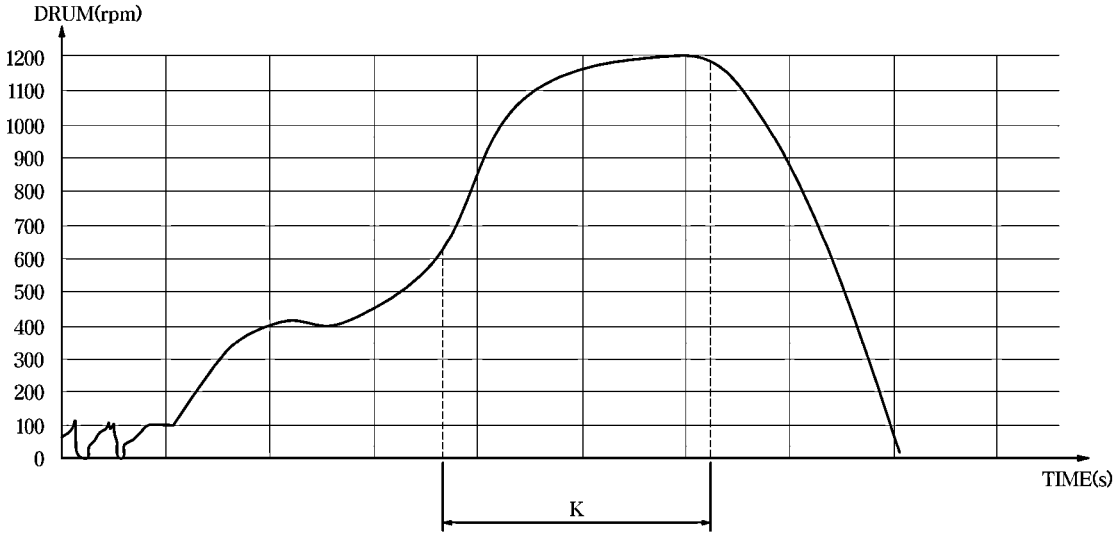
FIG. 11 illustrates an example of a rotational speed profile of a drum in a spin-drying process in a washing machine according to an embodiment.

FIG. 11 illustrates an example of a rotational speed profile of a drum in a spin-drying process in a washing machine according to an embodiment.

Referring to FIG. 11, in an acceleration section K during a spin-drying process, the drum 30 may accelerate to a maximum speed and maintain a rotation speed for a defined time after reaching the maximum speed.

The controller 90 may perform an operation of determining whether the weight balancer 36 is damaged based on a rotation speed of the drum 30 reaching a defined rotation speed. For example, the controller 90 may perform the operation of determining whether the weight balancer 36 is damaged based on the rotation speed of the drum 30 reaching a maximum rotation speed (e.g., approximately 1200 RPM) in the spin-drying process.

According to the disclosure, an x-axis angular speed Rx, a y-axis angular speed Ry, or a z-axis angular speed Rz of the tub 20 may be obtained based on sensor data output from the vibration sensor 55 while the rotation speed of the drum 30 is maintained, thereby obtaining more accurate rotation axis angular speed information.

According to various embodiments, the defined rotation speed may be predefined as another rotation speed, not the maximum rotation speed in the spin-drying process. Preferably, the defined rotation speed may be predefined as a rotation speed greater than the lowest speed (e.g., approximately 550 RPM) at which a rotational vibration component of the tub 20 due to the damage to the weight balancer 36 may be expressed.

In an embodiment, the controller 90 may control the driver 40 to maintain the rotation speed of the drum 30 for a defined time (e.g., approximately 2 seconds) based on the rotation speed of the drum 30 reaching the defined rotation speed. The controller 90 may perform an operation of obtaining a rotation axis angular speed of the tub 20 from the sensor data collected by the vibration sensor 55 while the rotation speed of the drum 30 is maintained, and may perform an operation of determining whether the weight balancer 36 is damaged.

According to the disclosure, whether the weight balancer 36 is damaged may be determined after the drum 30 is maintained at a defined rotation speed for a defined time before the rotation speed of the drum 30 reaches the maximum rotation speed in the spin-drying process. Accordingly, the damage to the weight balancer 36 may be prevented from deteriorating due to the acceleration of the drum 30.

The damage to the weight balancer 36 may include damage (e.g., cracks, corrosion) to a filling member (e.g., cement/concrete) filled inside the housing, or damage or loosening of a fastening member (e.g., a fastening bolt or nut) connecting the weight balancer 36 and the tub 20.

In a case where the weight balancer 36 is not tightly fixed to the tub 20 due to the damage to the fastening member that couples the weight balancer 36 and the tub 20, or in a case where the filling member of the weight balancer 36 is damaged, a rotational vibration of the tub 20 may be increased. For example, in a case where the weight balancer 36 is not tightly fixed to the tub 20 due to the damage to the fastening member that couples the weight balancer 36 and the tub 20, or in a case where the filling member of the weight balancer 36 is damaged, the tub 20 and the weight balancer 36 may continuously collide, causing the rotational vibration of the tub 20.

Accordingly, in a case where the rotational vibration of the tub 20 is large, it may be strongly assumed (estimated) that the weight balancer 36 is damaged.

The controller 90 may determine that the weight balancer 36 is damaged based on at least one of the x-axis angular speed Rx, the y-axis angular speed Ry, or the z-axis angular speed Rz of the tub 20 being greater than a preset angular speed.

For example, among the rotation axis angular speeds of the tub 20 caused by the damage to the weight balancer 36, higher-than-normal angular speed values may occur in the order of z-axis angular speed Rz, x-axis angular speed Rx, and y-axis angular speed Ry.

In an embodiment, the controller 90 may determine that the weight balancer 36 is damaged in a case where the z-axis angular speed Rz is greater than the preset angular speed.

According to various embodiments, the controller 90 may determine that the weight balancer 36 is damaged in a case where the x-axis angular speed Rx is greater than the preset angular speed.

According to various embodiments, in order to improve a reliability of estimating damage to the weight balancer 36, the controller 90 may determine that the weight balancer 36 is damaged in a case where the z-axis angular speed Rz is greater than the preset angular speed Rz_ref and the x-axis angular speed Rx is greater than the preset angular speed Rx_ref.

In addition, in order to improve the reliability and accuracy of estimating damage to the weight balancer 36, the rotation speed of the drum 30 is required to be constant for a defined period of time.

According to various embodiments, the controller 90 may perform the operation 1100 of obtaining the angular speed of the rotation axis of the tub 20 based on the defined condition being satisfied, or the operation 1200 of determining whether the weight balancer 36 is damaged based on the defined condition being satisfied.

Figure 12:
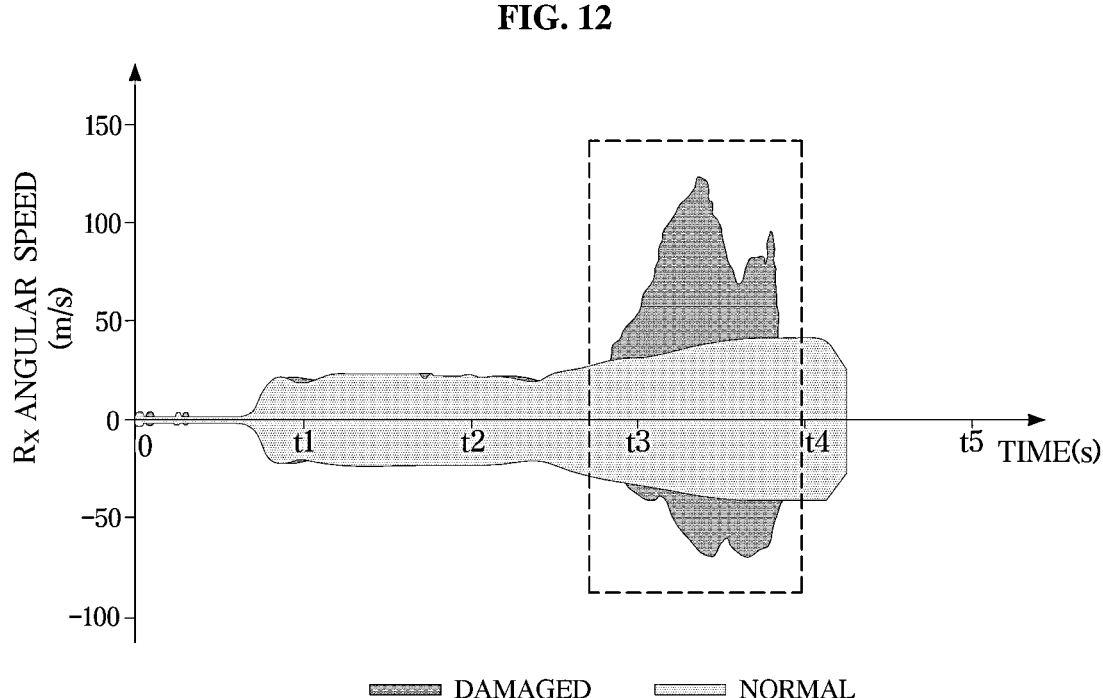
FIG. 12 illustrates an x-axis angular speed for a damaged weight balancer and a normal weight balancer in a washing machine according to an embodiment.

FIG. 12 illustrates an x-axis angular speed for a damaged weight balancer and a normal weight balancer in a washing machine according to an embodiment.

Referring to FIG. 12, a horizontal axis represents time, and a vertical axis represents an x-axis angular speed.

The x-axis angular speed when the weight balancer 36 is normal may be an x-axis angular speed that takes into account a rotational vibration of the tub 20 caused by eccentricity generated by laundry as well.

The x-axis angular speed when the weight balancer 36 is normal is shown as a light block. The x-axis angular speed when the weight balancer 36 is damaged is shown as dark blocks.

As the spin-drying process begins and the drum 30 starts to accelerate, it may be seen that the x-axis angular speed increases in t1 and t2 sections compared to an initial period, but is still within a normal range.

However, in a case where the drum 30 reaches near the maximum rotation speed in t3 and t4 sections, it may be seen that the x-axis angular speed is outside the normal range. In other words, it may be seen that the x-axis angular speed rapidly increases from 30 m/s, which is within the normal range, to 120 m/s, which is outside the normal range.

Accordingly, in a case where the x-axis angular speed is greater than the preset angular speed, it may be determined that the weight balancer 36 is damaged.

Figure 13:
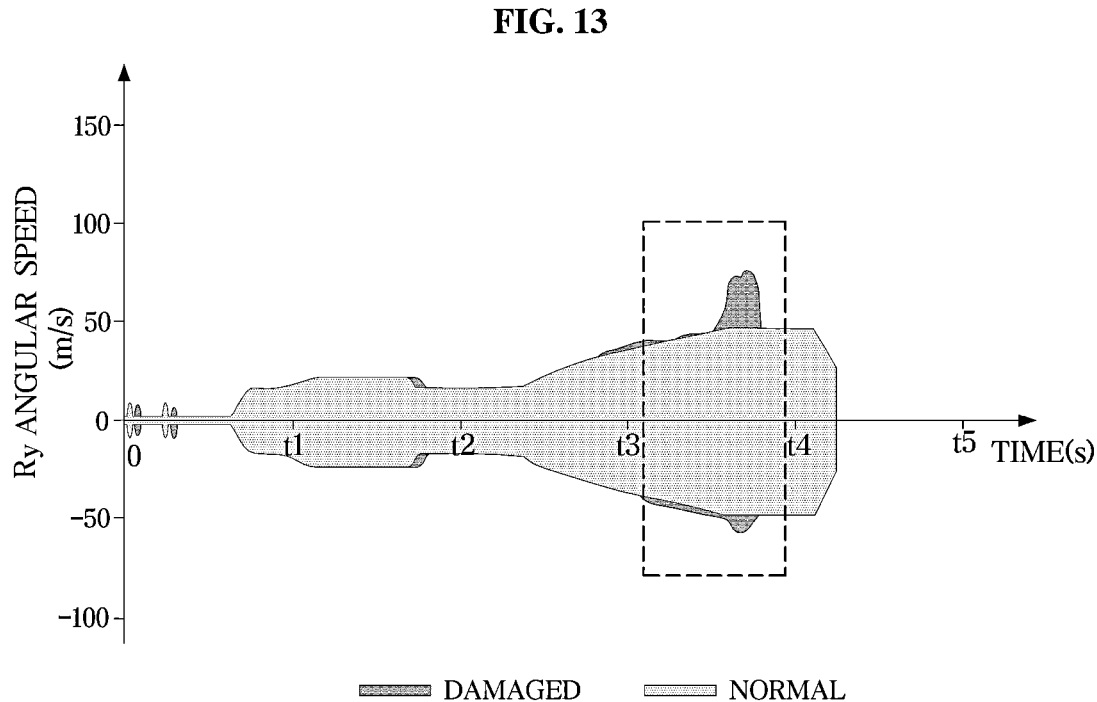
FIG. 13 illustrates a y-axis angular speed for a damaged weight balancer and a normal weight balancer in a washing machine according to an embodiment.

FIG. 13 illustrates a y-axis angular speed for a damaged weight balancer and a normal weight balancer in a washing machine according to an embodiment.

Referring to FIG. 13, a horizontal axis represents time, and a vertical axis represents a y-axis angular speed.

The y-axis angular speed when the weight balancer 36 is normal may be a y-axis angular speed that takes into account a rotational vibration of the tub 20 caused by eccentricity generated by laundry as well.

The y-axis angular speed when the weight balancer 36 is normal is shown as a light block. The y-axis angular speed when the weight balancer 36 is damaged is shown as dark blocks.

As the spin-drying process begins and the drum 30 starts to accelerate, it may be seen that the y-axis angular speed increases in t1 to t3 sections compared to an initial period, but is still within a normal range.

However, in a case where the drum 30 reaches near the maximum rotation speed between t3 and t4 sections, it may be seen that the y-axis angular speed is outside the normal range. In other words, it may be seen that the y-axis angular speed increases from 50 m/s, which is within the normal range, to 70 m/s, which is outside the normal range.

Accordingly, in a case where the y-axis angular speed is greater than the preset angular speed, it may be determined that the weight balancer 36 is damaged.

Figure 14:
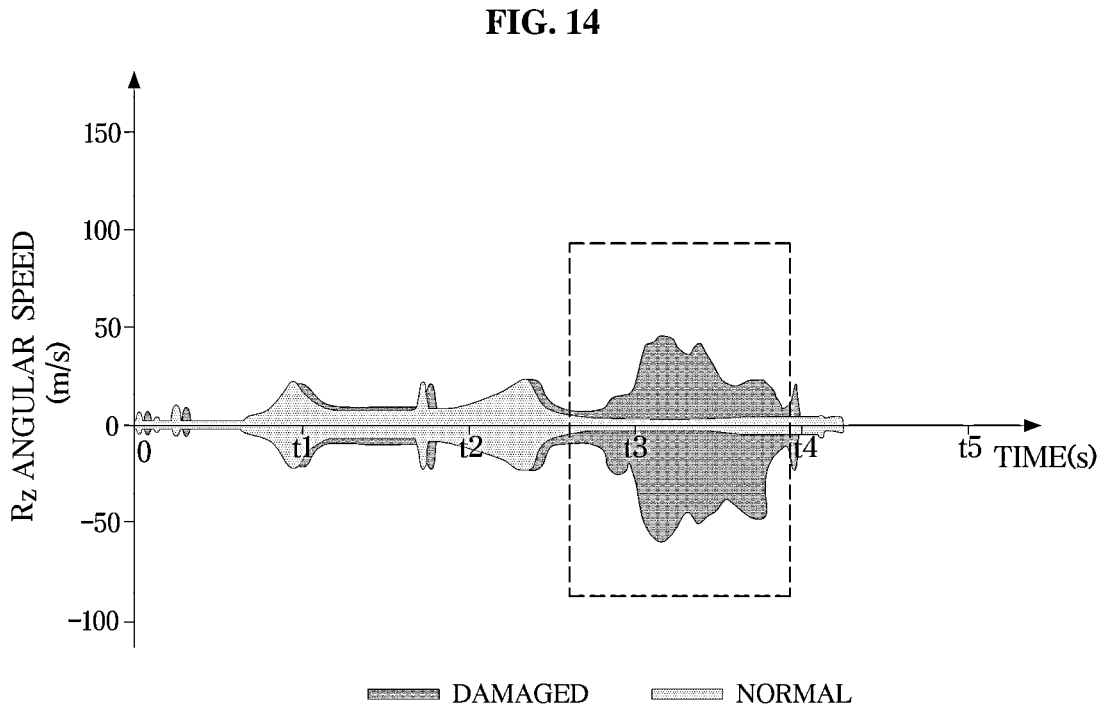
FIG. 14 illustrates a z-axis angular speed for a damaged weight balancer and a normal weight balancer in a washing machine according to an embodiment.

FIG. 14 illustrates a z-axis angular speed for a damaged weight balancer and a normal weight balancer in a washing machine according to an embodiment.

Referring to FIG. 14, a horizontal axis represents time, and a vertical axis represents a z-axis angular speed.

The z-axis angular speed when the weight balancer 36 is normal may be a z-axis angular speed that takes into account a rotational vibration of the tub 20 caused by eccentricity generated by laundry as well.

The z-axis angular speed when the weight balancer 36 is normal is shown as a light block. The z-axis angular speed when the weight balancer 36 is damaged is shown as dark blocks.

As the spin-drying process begins and the drum 30 starts to accelerate, it may be seen that the z-axis angular speed increases in t1 and t2 sections compared to an initial period, but is still within a normal range.

However, in a case where the drum 30 reaches near the maximum rotation speed in t3 and t4 sections, it may be seen that the z-axis angular speed is outside the normal range. In other words, it may be seen that the z-axis angular speed rapidly increases from 10 m/s, which is within the normal range, to 50 m/s, which is outside the normal range.

Accordingly, in a case where the z-axis angular speed is greater than the preset angular speed, it may be determined that the weight balancer 36 is damaged. It may be seen that when the weight balancer 36 is damaged, the z-axis angular speed shows a value greater than the normal range compared to the x-axis angular speed Rx or the y-axis angular speed Ry. Accordingly, whether the weight balancer 36 is damaged may be easily and accurately determined simply by using the z-axis angular speed.

Figure 15:
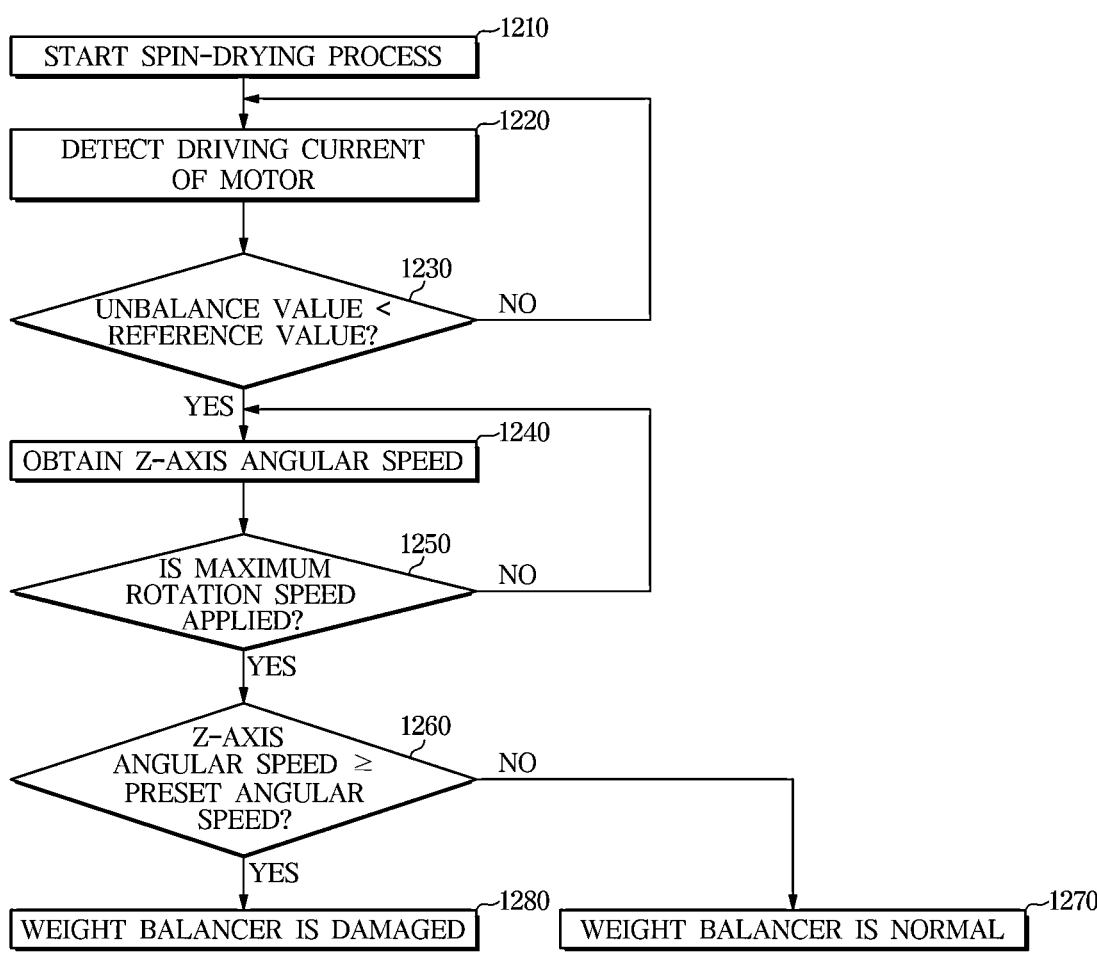
FIG. 15 illustrates an example of determining whether a weight balancer is damaged using a z-axis angular speed in a method for controlling a washing machine according to an embodiment.

FIG. 15 illustrates an example of determining whether a weight balancer is damaged using a z-axis angular speed in a method for controlling a washing machine according to an embodiment.

Referring to FIG. 15, the controller 90 may start a spin-drying process (1210).

The controller 90 may rotate the drum 30 at high speed to start the spin-drying process.

The controller 90 may detect a driving current of the motor 41 during the spin-drying process (1220).

For example, the controller 90 may detect the driving current applied to the motor 41 through the motor sensor 40c.

The controller 90 may determine whether an unbalance value of laundry in the drum 30 is less than a reference value (1230).

For example, the controller 90 may determine the unbalance value of the laundry in the drum 30 based on the driving current applied to the motor 41. In a case where the driving current applied to the motor 41 is less than a defined value, the controller 90 may determine that the unbalance value of the laundry is less than the reference value. In a case where the driving current applied to the motor 41 is greater than or equal to the defined value, the controller 90 may determine that the unbalance value of the laundry is greater than or equal to the reference value. The reference value may be an allowable unbalance value for moving on to a subsequent spin-drying process.

In response to the unbalance value of the laundry being greater than or equal to the reference value (No in operation 1230), the controller 90 may estimate that a large eccentricity has occurred in the drum 30 due to the laundry, restart the spin-drying process from the beginning, and re-detect the driving current of the motor 41.

In response to the unbalance value of the laundry being less than the reference value (Yes in operation 1230), the controller 90 may estimate that a small eccentricity has occurred in the drum 30 due to the laundry and proceed to a subsequent spin-drying process. In this instance, the controller 90 may rotate the drum 30 at a maximum rotation speed by accelerating the drum 30.

In response to the unbalance value of the laundry being less than the reference value (Yes in operation 1230), the controller 90 may obtain a z-axis angular speed based on an output value of the vibration sensor 55 (1240).

The controller 90 may determine whether the rotation speed of the drum 30 is the maximum rotation speed (1250).

In response to the rotation speed of the drum 30 being the maximum rotation speed (Yes in operation 1250), the controller 90 may determine whether a z-axis angular speed obtained when the rotation speed of the drum 30 is the maximum rotation speed is greater than or equal to a preset angular speed (1260).

In response to the z-axis angular speed being less than the preset angular speed, the controller 90 may determine that the weight balancer 36 is normal (1270).

In response to the z-axis angular speed being greater than or equal to the preset angular speed, the controller 90 may determine that the weight balancer 36 is damaged (1280).

According to the disclosure, a rotational vibration component of the tub 20, which shows a drastic change in the event of damage to the weight balancer 36, may be used to determine whether the weight balancer 36 is damaged, and thus whether abnormal rotational vibration of the tub 20 is caused by the damage to the weight balancer 36 may be confirmed.

Figure 16:
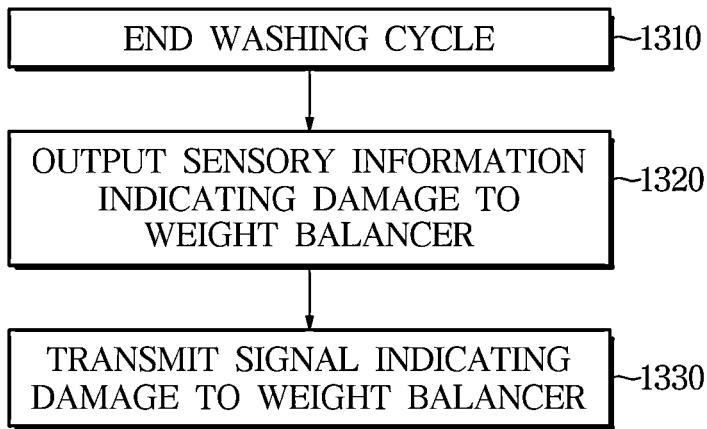
FIG. 16 is a flowchart illustrating an example of a method for controlling a washing machine in a case where a weight balancer is determined to be damaged according to an embodiment.

FIG. 16 is a flowchart illustrating an example of a method for controlling a washing machine in a case where a weight balancer is determined to be damaged according to an embodiment.

The controller 90 may perform at least one of operation 1310, operation 1320, or operation 1330 shown in FIG. 16 based on determining that the weight balancer 36 is damaged.

Referring to FIG. 16, the washing machine 1 may end a washing cycle based on determining that the weight balancer 36 is damaged (1310). For example, the controller 90 may control various components of the washing machine 1 (e.g., the driver 40, the water supply 50, the detergent supply 60, the drainage assembly 70) to end the washing cycle based on determining that the weight balancer 36 is damaged.

Ending the washing cycle may include stopping the drum 30.

For example, the controller 90 may stop the drum 30 based on determining that the weight balancer 36 is damaged.

Ending the washing cycle may refer to ending the washing cycle by omitting all the processes to be performed in the future among the processes shown in FIG. 8.

For example, in a case where the weight balancer 36 is determined to be damaged during the intermediate spin-dry 1015 of the washing process 1010, the controller 90 may skip (omit) the rinsing process 1020 and the final spin-drying process 1030 and immediately end the washing cycle.

As another example, in a case where the weight balancer 36 is determined to be damaged during the intermediate spin-dry 1024 of the rinsing process 1020, the controller 90 may skip the final spin-drying process 1030 and immediately end the washing cycle.

According to the disclosure, by ending the washing cycle immediately after determining that the weight balancer 36 is damaged, deterioration of the weight balancer 36 or damage to the washing machine 1 may be prevented in advance.

In an embodiment, based on determining that the weight balancer 36 is damaged, the controller 90 may only perform processes except for the process in which the drum 30 is required to be rotated above a defined rotation speed (e.g., spin-dry process 1015, 1024, and 1030).

For example, in a case where the weight balancer 36 is determined to be damaged during the intermediate spin-dry 1015 of the washing process 1010, the controller 90 may skip the intermediate spin-dry 1024 of the rinsing process 1020 and the final spin-drying process 1030 and perform the supply of water 1021, rinse 1022, and drain 1023 at least once.

According to the disclosure, user convenience may be achieved by performing the other processes except for the spin-drying process without worsening the weight balancer 36.

Figure 17:
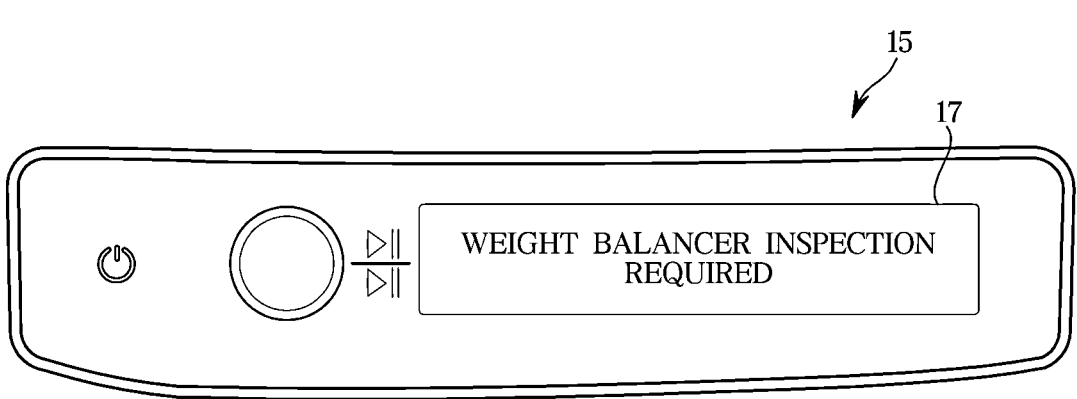
FIG. 17 illustrates an example where sensory information indicating a damage to a weight balancer is output by a washing machine according to an embodiment.

FIG. 17 illustrates an example where sensory information indicating a damage to a weight balancer is output by a washing machine according to an embodiment.

Referring to FIG. 17, the washing machine 1 may output sensory information indicating damage to the weight balancer 36 based on determining that the weight balancer 36 is damaged (1320).

For example, the controller 90 may control the user interface 15 (e.g., the output interface 17) to output the sensory information indicating damage to the weight balancer 36 based on determining that the weight balancer 36 is damaged.

For example, the output interface 17 may include a liquid crystal display (LCD) panel, a light emitting diode (LED) panel, a speaker, and the like. The sensory information indicating damage to the weight balancer 36 may include, for example, an image, animation, text, figure, sound, voice, and the like, indicating damage to the weight balancer 36. The sensory information indicating damage to the weight balancer 36 may be information for requesting inspection of the weight balancer 36.

The output interface 17 (e.g., a display) may provide the sensory information indicating damage to the weight balancer 36 based on a control signal from the controller 90.

For example, the output interface 17 may output text indicating that the weight balancer 36 is damaged. However, the sensory information indicating damage to the weight balancer 36 is not limited thereto.

As another example, the output interface 17 (e.g., a speaker) may output a sound indicating that the weight balancer 36 is damaged.

According to the disclosure, a user may recognize an abnormality in the weight balancer 36 and take immediate action, thereby preventing an occurrence of a loud noise due to the damage to the weight balancer 36. In addition, the user may recognize the abnormality in the weight balancer 36 and take immediate action, thereby preventing a risk of damage to the washing machine 1 due to damage to the weight balancer 36.

Figure 18:
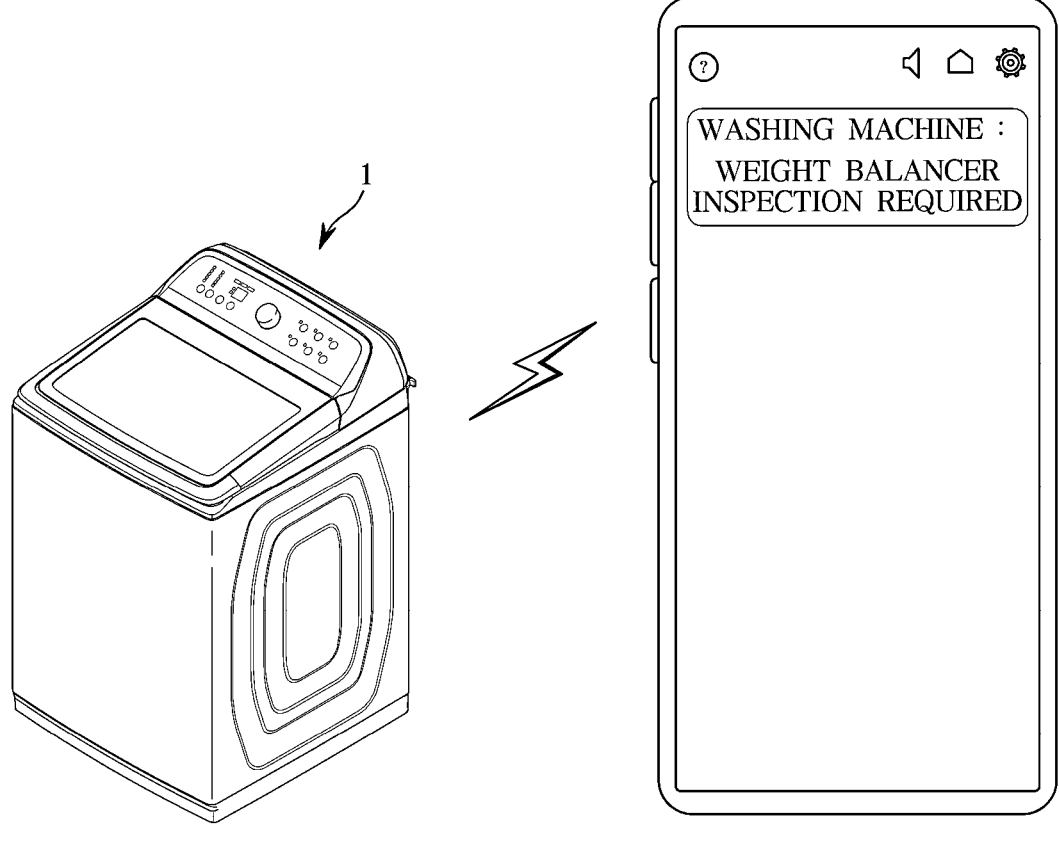
FIG. 18 illustrates an example where a signal for indicating a damage to a weight balancer is transmitted to an external device from a washing machine according to an embodiment.

FIG. 18 illustrates an example where a signal for indicating a damage to a weight balancer is transmitted to an external device from a washing machine according to an embodiment.

Referring to FIG. 18, the washing machine 1 may transmit a signal indicating damage to the weight balancer 36 to an external device (1330).

The controller 90 may control the communication circuitry 96 to transmit the signal indicating damage to the weight balancer 36 to the external device based on determining that the weight balancer 36 is damaged.

The external device may include a server, a user device (e.g., a smartphone), other home appliances, and the like.

For example, the signal indicating damage to the weight balancer 36 may be transmitted to a user device owned by a user of the washing machine 1 via a server.

Based on receiving the signal indicating damage to the weight balancer 36, the external device may output sensory information (e.g., image, vibration, sound, etc.) indicating damage to the weight balancer 36 through an output interface of the external device.

For example, in a case where the external device is a smartphone, the smartphone may output a notification message, vibration, and/or sound based on receiving the signal indicating damage to the weight balancer 36.

According to the disclosure, a user may recognize an abnormality in the weight balancer 36 and take immediate action.

Various embodiments of the disclosure are not intended to limit the technical features described in the disclosure to particular embodiments, and it should be construed as including various modifications, equivalents, or alternatives of a corresponding embodiment.

According to the disclosure, whether a weight balancer is damaged may be easily identified.

According to the disclosure, whether an abnormal vibration of a tub is caused by damage to a weight balancer may be confirmed.

According to the disclosure, a user may take proactive measures before damage to a weight balancer is deteriorated.

According to the disclosure, a 6-axis MEMS sensor may be used to detect a rotational vibration component of a tub that may not be detected by a 3-axis MEMS sensor, and thus whether a weight balancer is damaged may be determined.

The effects that may achieved by the disclosure are not limited to the above-mentioned effects, and other effects not mentioned will be clearly understood by one of ordinary skill in the technical art to which the disclosure belongs from the following description.

According to an embodiment of the disclosure, a washing machine 1 may include: a tub 20; a drum 30 configured to be rotatable inside the tub 20; a weight balancer 36 coupled to the tub 20; a vibration sensor 55 provided in the tub 20; and a controller 90, wherein the controller 90 may be configured to compare an unbalance value of laundry in the drum 30 with a reference value based on a driving current applied to a motor 41 configured to rotate the drum 30, obtain an angular speed of at least one rotation axis of the tub 20 based on an output value of the vibration sensor 55 in response to the unbalance value of the laundry being less than the reference value, and determine whether the weight balancer 36 is damaged based on the angular speed of the at least one rotation axis of the tub 20.

In addition, the controller 90 may be configured to determine that the weight balancer 36 is damaged based on the angular speed of the at least one rotation axis being greater than a preset angular speed.

In addition, the controller 90 may be configured to determine whether the weight balancer 36 is damaged based on a rotation speed of the drum 30 reaching a defined rotation speed.

In addition, the defined rotation speed may correspond to a maximum rotation speed in a spin-drying process In addition, the angular speed of the at least one rotation axis may include at least one of an x-axis angular speed, a y-axis angular speed, or a z-axis angular speed of the tub 20.

In addition, the vibration sensor 55 may be a 1-axis gyro sensor configured to detect one of an x-axis angular speed, a y-axis angular speed, or a z-axis angular speed of the tub 20, a 2-axis gyro sensor configured to detect two of the x-axis angular speed, the y-axis angular speed, or the z-axis angular speed of the tub, a 3-axis gyro sensor configured to detect all of the x-axis angular speed, the y-axis angular speed, and the z-axis angular speed of the tub, or a 6-axis microelectromechanical systems (MEMS) sensor.

In addition, the controller 90 may be configured to determine whether the unbalance value of the laundry in the drum 30 is less than the reference value based on the driving current applied to the motor 41 configured to rotate the drum 30, and determine whether the weight balancer 36 is damaged in response to the unbalance value of the laundry being less than the reference value.

In addition, the washing machine 1 may further include an output interface 17, wherein the controller 90 may be configured to control the output interface 17 to output sensory information indicating that the weight balancer 36 is damaged based on determining that the weight balancer 36 is damaged.

In addition, the controller 90 may be configured to stop the drum 30 or end a washing cycle based on determining that the weight balancer 36 is damaged.

In addition, the washing machine 1 may further include a communication circuitry 96 configured to communicate with an external device, wherein the controller 90 may be configured to control the communication circuitry 96 to transmit a signal indicating that the weight balancer 36 is damaged to the external device based on determining that the weight balancer 36 is damaged.

According to an embodiment of the disclosure, a method for controlling a washing machine 1 including a vibration sensor 55 provided in a tub 20 may include: obtaining an angular speed of at least one rotation axis of the tub 20 based on an output value of the vibration sensor 55, and determining whether a weight balancer 36 coupled to the tub 20 is damaged based on the angular speed of the at least one rotation axis of the tub 20.

In addition, the determining of whether the weight balancer 36 is damaged may include determining that the weight balancer 36 is damaged based on the angular speed of the at least one rotation axis being greater than a preset angular speed.

In addition, the determining of whether the weight balancer 36 is damaged may be performed based on a rotation speed of a drum 30 reaching a defined rotation speed.

In addition, the defined rotation speed may correspond to a maximum rotation speed in a spin-drying process.

In addition, the angular speed of the at least one rotation axis may include at least one of an x-axis angular speed, a y-axis angular speed, or a z-axis angular speed of the tub 20.

In addition, the vibration sensor 55 may be a 1-axis gyro sensor configured to detect one of an x-axis angular speed, a y-axis angular speed, or a z-axis angular speed of the tub 20, a 2-axis gyro sensor configured to detect two of the x-axis angular speed, the y-axis angular speed, or the z-axis angular speed of the tub, a 3-axis gyro sensor configured to detect all of the x-axis angular speed, the y-axis angular speed, and the z-axis angular speed of the tub, or a 6-axis MEMS sensor.

In addition, the method may further include determining whether the unbalance value of the laundry in the drum 30 is less than the reference value based on the driving current applied to the motor 41 configured to rotate the drum 30, and the determining of whether the weight balancer 36 is damaged may include determining whether the weight balancer 36 is damaged in response to the unbalance value of the laundry being less than the reference value.

In addition, the method may further include outputting sensory information indicating that the weight balancer 36 is damaged based on determining that the weight balancer 36 is damaged.

In addition, the method may further include stopping the drum 30 or ending a washing cycle based on determining that the weight balancer 36 is damaged.

In addition, the method may further include transmitting a signal indicating that the weight balancer 36 is damaged to an external device based on determining that the weight balancer 36 is damaged.

The disclosed embodiments may be implemented in the form of a recording medium that stores instructions executable by a computer. The instructions may be stored in the form of program codes, and when executed by a processor, the instructions may create a program module to perform operations of the disclosed embodiments. The recording medium may be implemented as a computer-readable recording medium.

The computer-readable recording medium may include all kinds of recording media storing instructions that may be interpreted by a computer. For example, the computer-readable recording medium may be a read only memory (ROM), a random access memory (RAM), a magnetic tape, a magnetic disk, a flash memory, an optical data storage, etc.

The computer-readable storage medium may be provided in the form of a non-transitory storage medium. Here, when a storage medium is referred to as "non-transitory", it may be understood that the storage medium is tangible and does not include a signal (e.g., an electromagnetic wave), but rather that data is semi-permanently or temporarily stored in the storage medium. For example, a "non-transitory storage medium" may include a buffer in which data is temporarily stored.

According to an embodiment, the method according to the various embodiments disclosed herein may be provided in a computer program product. The computer program product may be traded between a seller and a buyer as a product. The computer program product may be distributed in the form of a machine-readable storage medium (e.g., compact disc read only memory (CD-ROM)), or may be distributed (e.g., download or upload) through an application store (e.g., Play Store™) online or directly between two user devices (e.g., smartphones). In the case of online distribution, at least a portion of the computer program product (e.g., download-able app) may be stored at least semi-permanently or may be temporarily generated in a storage medium, such as a memory of a server of a manufacturer, a server of an application store, or a relay server.

Although disclosure has been shown and described in relation to specific embodiments, it would be appreciated by those skilled in the art that changes and modifications may be made in these embodiments without departing from the principles and scope of the disclosure, the scope of which is defined in the claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A washing machine, comprising:
a tub;
a drum configured to be rotatable inside the tub;
a weight balancer coupled to the tub;
a vibration sensor provided in the tub; and
a controller,
wherein the controller is configured to:
compare an unbalance value of laundry in the drum with a reference value based on a driving current applied to a motor configured to rotate the drum,
in response to the unbalance value of the laundry being less than the reference value, obtain an angular speed of at least one rotation axis of the tub based on an output value of the vibration sensor, and
determine whether the weight balancer is damaged based on the angular speed of the at least one rotation axis of the tub.

2. The washing machine of claim 1, wherein the controller is further configured to determine that the weight balancer is damaged based on the angular speed of the at least one rotation axis being greater than a preset angular speed.

3. The washing machine of claim 1, wherein the controller is further configured to determine whether the weight balancer is damaged based on a rotation speed of the drum reaching a defined rotation speed.

4. The washing machine of claim 3, wherein the defined rotation speed corresponds to a maximum rotation speed in a spin-drying process.

5. The washing machine of claim 1, wherein the angular speed of the at least one rotation axis includes at least one of an x-axis angular speed, a y-axis angular speed, and a z-axis angular speed of the tub.

6. The washing machine of claim 1, wherein the vibration sensor is a 1-axis gyro sensor configured to detect one of an x-axis angular speed, a y-axis angular speed, or a z-axis angular speed of the tub, a 2-axis gyro sensor configured to detect two of the x-axis angular speed, the y-axis angular speed, or the z-axis angular speed of the tub, a 3-axis gyro sensor configured to detect all of the x-axis angular speed, the y-axis angular speed, and the z-axis angular speed of the tub, or a 6-axis microelectromechanical systems (MEMS) sensor.

7. The washing machine of claim 1, wherein the controller is further configured to:

determine whether the unbalance value of the laundry in the drum is less than the reference value based on the driving current applied to the motor configured to rotate the drum, and determine whether the weight balancer is damaged in response to the unbalance value of the laundry being less than the reference value.

8. The washing machine of claim 1, further comprising: an output interface, wherein the controller is further configured to control the output interface to output sensory information indicating that the weight balancer is damaged based on determining that the weight balancer is damaged.

9. The washing machine of claim 1, wherein the controller is further configured to stop the drum or end a washing cycle based on determining that the weight balancer is damaged.

10. The washing machine of claim 1, further comprising: a communication circuitry configured to communicate with an external device, wherein the controller is further configured to control the communication circuitry to transmit a signal indicating that the weight balancer is damaged to the external device based on determining that the weight balancer is damaged.

11. A method for controlling a washing machine comprising a vibration sensor provided in a tub, the method comprising:

obtaining an angular speed of at least one rotation axis of the tub based on an output value of the vibration sensor, and determining whether a weight balancer coupled to the tub is damaged based on the angular speed of the at least one rotation axis of the tub.

12. The method of claim 11, wherein the determining of whether the weight balancer is damaged comprises determining that the weight balancer is damaged based on the angular speed of the at least one rotation axis being greater than a preset angular speed.

13. The method of claim 11, wherein the determining of whether the weight balancer is damaged is performed based on a rotation speed of a drum reaching a defined rotation speed.

14. The method of claim 13, wherein the defined rotation speed corresponds to a maximum rotation speed in a spin-drying process.

15. The method of claim 11, wherein the angular speed of the at least one rotation axis includes at least one of an x-axis angular speed, a y-axis angular speed, and a z-axis angular speed of the tub.

16. The method of claim 11, wherein the vibration sensor is a 1-axis gyro sensor configured to detect one of an x-axis angular speed, a y-axis angular speed, or a z-axis angular speed of the tub, a 2-axis gyro sensor configured to detect two of the x-axis angular speed, the y-axis angular speed, or the z-axis angular speed of the tub, a 3-axis gyro sensor configured to detect all of the x-axis angular speed, the y-axis angular speed, and the z-axis angular speed of the tub, or a 6-axis microelectromechanical systems (MEMS) sensor.

17. The method of claim 11, further comprising:

determining whether an unbalance value of laundry in a drum is less than a reference value based on a driving current applied to a motor configured to rotate the drum, and determining whether the weight balancer is damaged in response to the unbalance value of the laundry being less than the reference value.

18. The method of claim 11, further comprising:

controlling an output interface to output sensory information indicating that the weight balancer is damaged based on determining that the weight balancer is damaged.

19. The method of claim 11, further comprising:

stopping a drum or end a washing cycle based on determining that the weight balancer is damaged.

20. The method of claim 11, further comprising:

transmitting a signal indicating that the weight balancer is damaged to an external device based on determining that the weight balancer is damaged.

* * * * *